(12) United States Patent
Nair

(10) Patent No.: US 11,483,307 B2
(45) Date of Patent: *Oct. 25, 2022

(54) SYSTEM AND METHOD FOR MANAGING THE MULTI-FACTOR AUTHENTICATION DATA OF A USER

(71) Applicant: Vivek Chinar Nair, San Jose, CA (US)

(72) Inventor: Vivek Chinar Nair, San Jose, CA (US)

( * ) Notice: Subject to any disclaimer, the term of this patent is extended or adjusted under 35 U.S.C. 154(b) by 35 days.

This patent is subject to a terminal disclaimer.

Patent file contains an affidavit/declaration under 37 CFR 1.130(b).

(21) Appl. No.: 16/882,041

(22) Filed: May 22, 2020

(65) Prior Publication Data

US 2021/0014219 A1 Jan. 14, 2021

Related U.S. Application Data

(63) Continuation of application No. 15/845,400, filed on Dec. 18, 2017, now Pat. No. 10,701,064.

(Continued)

(51) Int. Cl.
| | |
|---|---|
| *H04L 9/40* | (2022.01) |
| *H04L 9/08* | (2006.01) |
| *H04L 9/32* | (2006.01) |
| *G06F 21/32* | (2013.01) |
| *G06F 21/40* | (2013.01) |

(Continued)

(52) U.S. Cl.
CPC .......... *H04L 63/0838* (2013.01); *G06F 9/547* (2013.01); *G06F 21/32* (2013.01); *G06F 21/40* (2013.01); *H04L 9/0863* (2013.01); *H04L 9/3228* (2013.01); *H04L 63/0861* (2013.01); *H04W 4/12* (2013.01); *G10L 15/26* (2013.01); *H04L 2463/082* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,533,783 B1 * | 9/2013 | Channakeshava | .......................... H04L 63/0853 726/4 |
| 9,596,223 B1 * | 3/2017 | Mezei | ................... H04W 12/04 |

(Continued)

FOREIGN PATENT DOCUMENTS

KR 20160137192 A * 11/2016 .............. H04W 4/12

*Primary Examiner* — Michael Pyzocha
(74) *Attorney, Agent, or Firm* — Robinson IP Law, PLLC

(57) ABSTRACT

A system for managing multi-factor authentication of a user includes: one or more source components for obtaining multi-factor authentication data by one or more of: receiving multi-factor authentication data via a network; generating multi-factor authentication data using an algorithm, and a user providing multi-factor authentication data; a routing component for associating the multi-factor authentication codes from the one or more source components with an appropriate user account; a database comprising multi-factor authentication data wherein components of the multi-factor authentication data are stored in association with a particular user account; and one or more delivery components for providing the multi-factor authentication data to a user on a user device.

16 Claims, 28 Drawing Sheets

Related U.S. Application Data

(60) Provisional application No. 62/435,227, filed on Dec. 16, 2016.

(51) Int. Cl.
*H04W 12/06* (2021.01)
*G06F 9/54* (2006.01)
*H04W 4/12* (2009.01)
*G10L 15/26* (2006.01)

(56) References Cited

U.S. PATENT DOCUMENTS

| | | | |
|---|---|---|---|
| 9,722,984 B2* | 8/2017 | Burch | H04L 63/18 |
| 10,057,227 B1* | 8/2018 | Hess | H04L 63/0853 |
| 10,200,359 B1* | 2/2019 | Sokolov | H04L 67/42 |
| 2004/0151288 A1* | 8/2004 | Lee | H04M 3/42382 |
| | | | 379/201.01 |
| 2007/0175978 A1* | 8/2007 | Stambaugh | G06Q 20/32 |
| | | | 235/379 |
| 2007/0254637 A1* | 11/2007 | Plant | H04M 3/42374 |
| | | | 455/418 |
| 2008/0141353 A1* | 6/2008 | Brown | G06F 21/42 |
| | | | 726/7 |
| 2009/0047928 A1* | 2/2009 | Utsch | G06Q 20/3223 |
| | | | 455/410 |
| 2010/0274692 A1* | 10/2010 | Hammad | G06Q 40/00 |
| | | | 705/30 |
| 2011/0184866 A1* | 7/2011 | Shakkarwar | G06Q 20/10 |
| | | | 705/44 |
| 2012/0222099 A1* | 8/2012 | Narendra | G06Q 20/3221 |
| | | | 726/6 |
| 2013/0097682 A1* | 4/2013 | Zeljkovic | H04L 9/3231 |
| | | | 726/7 |
| 2013/0183949 A1* | 7/2013 | Sulmar | H04W 4/14 |
| | | | 455/415 |
| 2013/0344904 A1* | 12/2013 | Murarka | H04W 4/50 |
| | | | 455/466 |
| 2014/0006517 A1* | 1/2014 | Hsiao | A63F 13/795 |
| | | | 709/205 |
| 2014/0237236 A1* | 8/2014 | Kalinichenko | H04L 63/0853 |
| | | | 713/168 |
| 2015/0121498 A1* | 4/2015 | Burch | H04W 12/04 |
| | | | 726/7 |
| 2015/0324789 A1* | 11/2015 | Dvorak | H04W 12/06 |
| | | | 705/67 |
| 2015/0341416 A1* | 11/2015 | Chung | H04L 67/10 |
| | | | 715/738 |
| 2016/0112875 A1* | 4/2016 | Kasravi | H04L 63/105 |
| | | | 455/411 |
| 2016/0197914 A1* | 7/2016 | Oberheide | H04L 63/0869 |
| | | | 713/183 |
| 2016/0217280 A1* | 7/2016 | Oberheide | H04L 63/18 |
| 2017/0011214 A1* | 1/2017 | Cavanagh | H04L 63/06 |
| 2017/0289809 A1* | 10/2017 | Smith | H04B 1/3827 |
| 2017/0346815 A1* | 11/2017 | Andrews | H04L 63/0876 |
| 2018/0077133 A1* | 3/2018 | Matute | H04L 63/0807 |

\* cited by examiner

SYSTEM AND METHOD FOR MANAGING THE MULTI-FACTOR AUTHENTICATION DATA OF A USER

CROSS-REFERENCE TO RELATED APPLICATION

This application claims priority to and is a continuation of U.S. patent application Ser. No. 15/845,400 for a "Secure System and Method for Managing the Multi-factor Authentication of a User" filed on Dec. 18, 2017, which claims priority to and is a non-provisional of U.S. Provisional Patent Application Ser. No. 62/435,227 for a "Virtual Phone for Receiving Two-Factor Authentication Codes" filed on Dec. 16, 2016, the contents of which are incorporated by reference herein by its entirety.

FIELD

This disclosure relates to the field of user authentication. More particularly, this disclosure relates to systems and methods for managing the multi-factor authentication of a user.

BACKGROUND

Multi-factor authentication ("MFA") is a failure-tolerant method of computer access control that requires a user to provide multiple means of verification to gain access to a system.

Two-factor authentication ("2FA") is a form of multi-factor authentication that requires a user to provide two means of verification to gain access to a system. Two-factor authentication is widely viewed as a more secure method of authenticating a user attempting to log in to a user account than the use of a single authentication factor alone.

One authentication method commonly used in multi-factor authentication systems includes transmission of a one-time pin ("OTP") via SMS text messaging to a user's phone or portable device. In the case of SMS two-factor authentication, a user first enters the user's login credentials including, for example, a username and password, this constituting the first authentication factor. Upon entering the login credentials, an OTP code is transmitted to a device associated with a phone number stored with an account of the user. The user then enters the code to verify the user's identity, this constituting the second authentication factor. In a multi-factor authentication scheme, additional means of verification may be used before granting account access. In the case of a two-factor authentication scheme, and access to the account is now granted. A commonly used process of SMS two-factor authentication is illustrated in FIG. 1. In a first step, an end user begins a login process with the user's username and password. In a second step, an online service sends a confirmation message containing a randomly-generated OTP via a phone network. In a third step the message is delivered from the phone network to the user's device. In a fourth step, the user enters the OTP to complete the login process.

Additional known multi-factor authentication processes exist that allow authentication of a user using a verification code or OTP. For example, time-based one-time password ("TOTP") algorithms may be used to generate a one-time verification code when a user desires to log in to an account. Similarly, HMAC-based one-time password ("HOTP") algorithms also provide for a one-time verification code to authenticate an identity of a user.

Two-factor authentication, in theory, provides an increase in security of a user's account because a would-be hacker would be required to have access to both a user's primary login credentials (such as username and password) and the user's second factor (such as a phone). It is estimated that approximately 46% of internet users utilize some form of multi-factor authentication, and that over 90% of the most heavily trafficked websites on the Internet support two-factor authentication.

While SMS two-factor authentication theoretically provides significant security advantages over sole or single password authentication methods, the popularity of SMS as a two-factor authentication method has revealed vulnerabilities that may be exploited to gain access to an account protected by two-factor authentication. For example, one possible exploit of SMS two-factor authentication is that a third party may obtain physical access to a user's phone or portable device and is therefore able to receive the second factor code of the user. Similarly, a third party may fraudulently request a replacement SIM card from the user's cellular phone service provider. When the third party obtains a replacement SIM card, the second factor code is received on a device of the third party, thereby granting access to the user's account. A process of re-directing inbound SMS messages to a hacker's device using a SIM card swap is illustrated in FIG. 2. Other known vulnerabilities include the use of a hardware device such as an IMSI catcher, the exploitation of vulnerabilities in the SS7 protocols, and the use of spyware or remote access software that exploits vulnerabilities related to the user's device. Similar vulnerabilities may also exist in other two-factor authentication methods including TOTP and HOTP.

In some cases, two-factor authentication may in fact create new vulnerabilities that do not exist with single password authentication methods. For example, most if not all websites and services include a process of recovering a lost password. Traditionally, the password reset process works by sending the user an email to confirm the password change. However, some services have recently begun allowing password resets to be accomplished using the same cell phone of a user used for receiving a second factor authentication code. This effectively reverts the authentication process to a single factor authentication system. Combined with the vulnerabilities described above, the user's account is therefore protected by a single vulnerable factor. If an attacker is able to gain access to a user's phone or the user's SMS messages, the attacker would be able to change the user's password without knowing the user's previous password. This means that an attacker could gain access to a user account with only a user name and access to the user's phone or SMS text messages. Each of these vulnerabilities may result in circumvention of a two-factor authentication process and allow a nefarious third party to access an account of the user.

In addition to various security vulnerabilities, two-factor authentication also creates practical issues that inhibit adoption or utilization of the two-factor process. One issue arises when a user loses access to the user's cell phone, such as when the device malfunctions or is otherwise inoperable. A similar issue arises when a user is without a connection to a cellular network such that the user's phone is incapable of receiving SMS text messages. In either event, the user is unable to receive the second factor code on the user's cell phone, which would result in the user becoming locked out of their accounts. An additional issue arises when a user obtains a new phone number, and the user must then update any accounts utilizing two-factor authentication to include the user's new phone number for transmission of the second factor code. Similar issues may exist with respect to attempting to retrieve one-time verification codes using other methods, such as TOTP and HOTP.

Therefore, while two-factor authentication generally reduces a risk of unauthorized access to a user's account by a third party, various vulnerabilities still exist in current implementations and in some cases the risk of unauthorized access is actually increased over having no two-factor authentication. Practical inconveniences of two-factor authentication further inhibit adoption of two-factor authentication by users. What is needed, therefore, is a secure system and method for managing the multi-factor authentication data of a user.

SUMMARY

The above and other needs are met by a secure system and method for managing the multi-factor data authentication of a user. In a first aspect, a system for receiving multi-factor authentication messages includes: one or more virtual phones hosted on a server, the one or more virtual phones associated with one or more telephone numbers and configured to receive multi-factor authentication messages directed to the one or more telephone numbers; a routing component for associating data derived from a received multi-factor authentication message with an appropriate user account; a database comprising multi-factor authentication data wherein portions of the multi-factor authentication data are stored in association with a particular user account; a user-facing application interface for providing data derived from the received authentication message and authentication code to a user on a user device, as shown in FIG. 21.

In one embodiment, the multi-factor authentication system further includes a message parsing component that recognizes a source of the multi-factor authentication message based on one or more of: text within a body of the received multi-factor authentication message; an origination number of the received multi-factor authentication message; a destination number of the received multi-factor authentication message; and data derived from the received multi-factor authentication message, as shown in FIG. 22.

In another embodiment, the message parsing component further improves recognition of a source of the multi-factor authentication message based on previous actions of one or more of the users, as shown in FIG. 23.

In yet another embodiment, the multi-factor authentication system further includes a message parsing component that identifies a multi-factor authentication code within the received multi-factor authentication message, as shown in FIG. 24.

In one embodiment, one or more of the telephone numbers is capable of receiving data for multiple user accounts, as shown in FIG. 25.

In another embodiment, multi-factor authentication messages comprise SMS messages including a multi-factor authentication code, as shown in FIG. 26.

In yet another embodiment, multi-factor authentication messages include audio messages containing a multi-factor authentication code, as shown in FIG. 27.

In one embodiment, audio messages containing the multi-factor authentication code are further analyzed using speech-to-text software prior to data derived from the received audio messages being provided to the user on the user device, as shown in FIG. 28.

In a second aspect, a system for managing multi-factor authentication of a user includes: one or more source components for obtaining multi-factor authentication data by one or more of: receiving multi-factor authentication data via a network; generating multi-factor authentication data using an algorithm, and a user providing multi-factor authentication data; a routing component for associating the multi-factor authentication codes from the one or more source components with an appropriate user account; a database comprising multi-factor authentication data wherein components of the multi-factor authentication data are stored in association with a particular user account; one or more delivery components for providing the multi-factor authentication data to a user on a user device, as shown in FIG. 29.

In one embodiment, one or more of the one or more source components comprises receiving a multi-factor authentication code via an SMS message, as shown in FIG. 30.

In another embodiment, one or more of the one or more source components comprises receiving a multi-factor authentication code via an audio message, as shown in FIG. 31.

In yet another embodiment, one or more of the one or more source components comprises receiving multi-factor authentication over a network via an API, as shown in FIG. 32.

In one embodiment, one or more of the one or more source components comprises generating a multi-factor authentication code using one or more of TOTP and HOTP, as shown in FIG. 33.

In another embodiment, one or more of the one or more delivery components comprises an application implemented on the user's mobile device, as shown in FIG. 34.

In yet another embodiment, the application implemented on the user's mobile device comprises one of the one or more source components by forwarding authentication messages received on the user's mobile device to the routing component, as shown in FIG. 35.

In one embodiment, the application implemented on the user's mobile device verifies an identity of the user through biometric data collected via one or more sensors of the user's mobile device, as shown in FIG. 36.

In another embodiment, one or more of the one or more delivery components comprises a browser extension implemented on a web browser of the user, as shown in FIG. 37.

In yet another embodiment, the browser extension implemented on the user's web browser is further configured to input multi-factor authentication data into websites supporting multi-factor authentication, as shown in FIG. 38.

In one embodiment, one or more of the one or more delivery components comprises transmitting authentication data to a third-party service over a network via an API, as shown in FIG. 39.

In another embodiment, the database further comprises additional authentication data for authenticating the user with one or more third-party services, the additional authentication data comprising one or more of: a username; an email address; a password; a recovery code; a PIN code; a security question; an answer to the security question; biometric data; and geolocation data, as shown in FIG. 40.

In yet another embodiment, one or more of the delivery components is further configured to provide the additional authentication to the user on a user device, as shown in FIG. 41.

In one embodiment, the system for managing multi-factor authentication of a user further includes an access control component for restricting user access to authentication data stored on the database based on one or more access control policies, as shown in FIG. 42.

In another embodiment, the access control module is further configured to allow two or more users access to the same multi-factor authentication data, as shown in FIG. 43.

In yet another embodiment, the system for managing multi-factor authentication of a user further includes an auditing component for retaining events related to user security, including one or more of: addition of a user account; removal of a user account; retrieval of multi-factor authentication data from the database; addition of new multi-factor authentication data from the database; receipt of multi-factor authentication data via a network by a source component; a change of settings for a user account; and a user accessing a user account, as shown in FIG. 44.

In one embodiment, authentication data is displayed on the user-facing application interface only when a user provides instructions to retrieve the authentication data, and wherein the audit module retains information related to the user instructing the system to retrieve the authentication data to ensure that a record exists containing every instance the authentication data was accessed, as shown in FIG. 45.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of a system and method of virtual two-factor authentication described herein may be implemented using various components such as one or more computers, computer readable storage mediums, and computer networks for storing and transmitting data and hosting a plurality of virtual phones as described in greater detail below. The system and method of virtual-two factor authentication is operable across multiple components using network connectivity, servers, databases, and devices such as smartphones or personal computers to receive and transmit data between components as part of a two-factor user login process.

Figure 1:
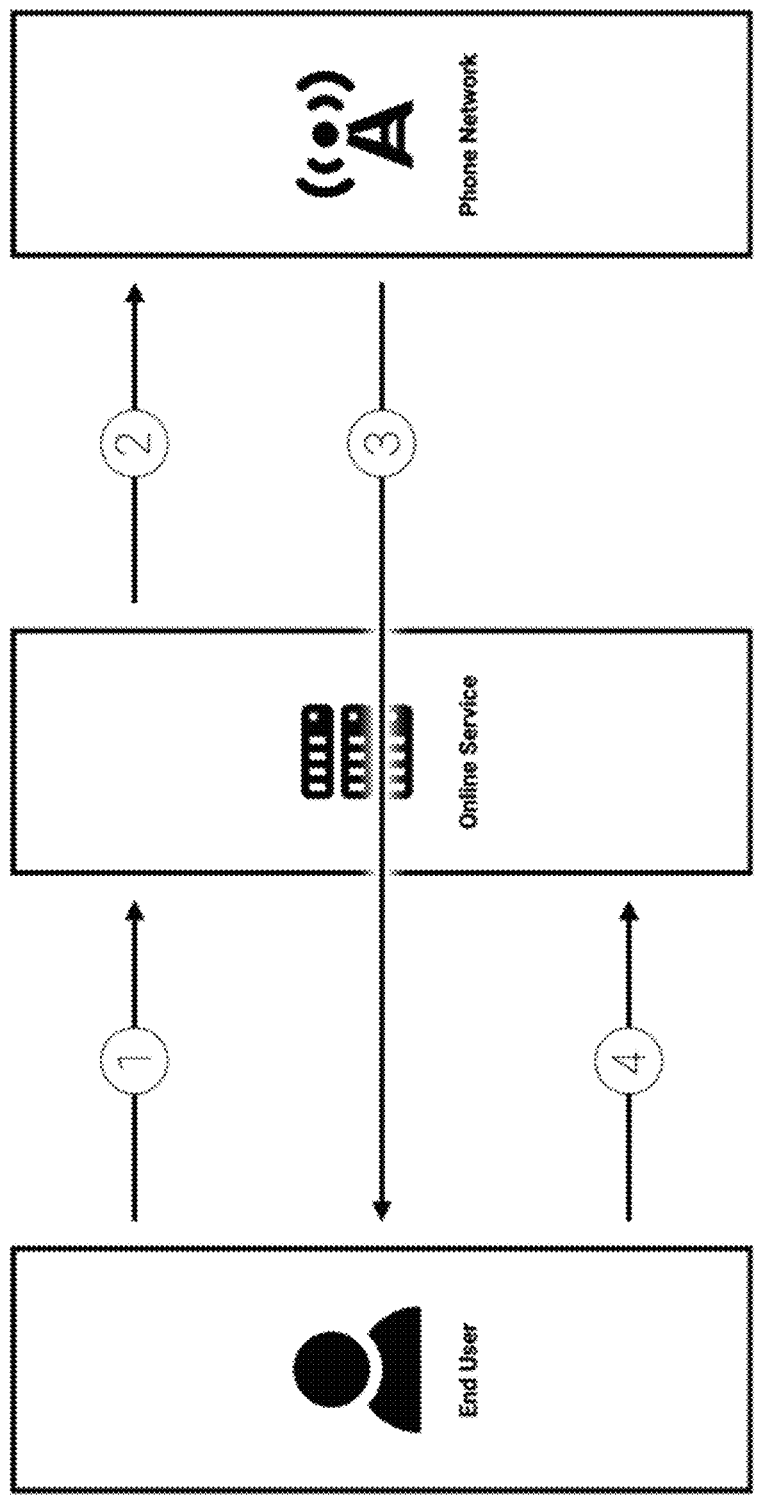
FIG. 1 shows a flow chart of a process of SMS two-factor authentication according to one embodiment of the present disclosure.
Figure 2:
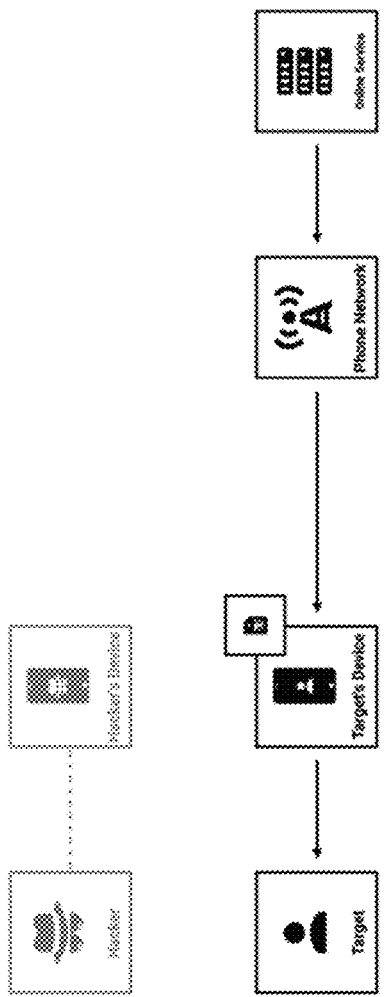
FIG. 2 shows a process of re-directing an inbound SMS message from a user's phone using a SIM card swap according to one embodiment of the present disclosure.
Figure 2:
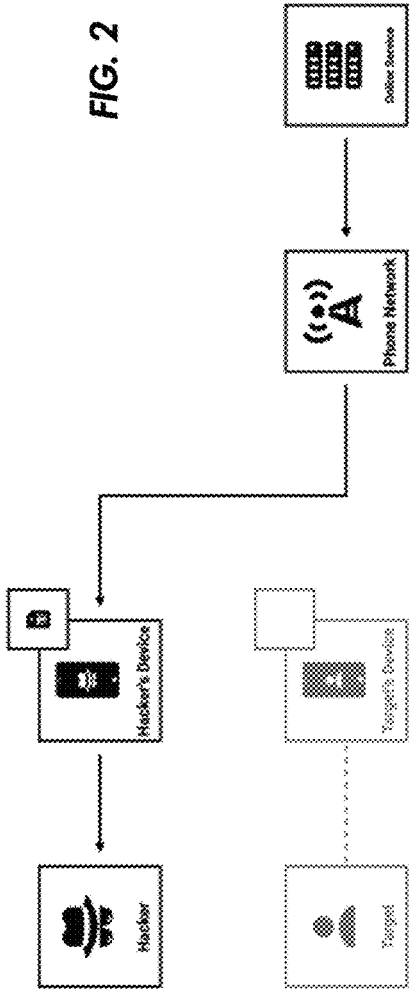
Figure 3:
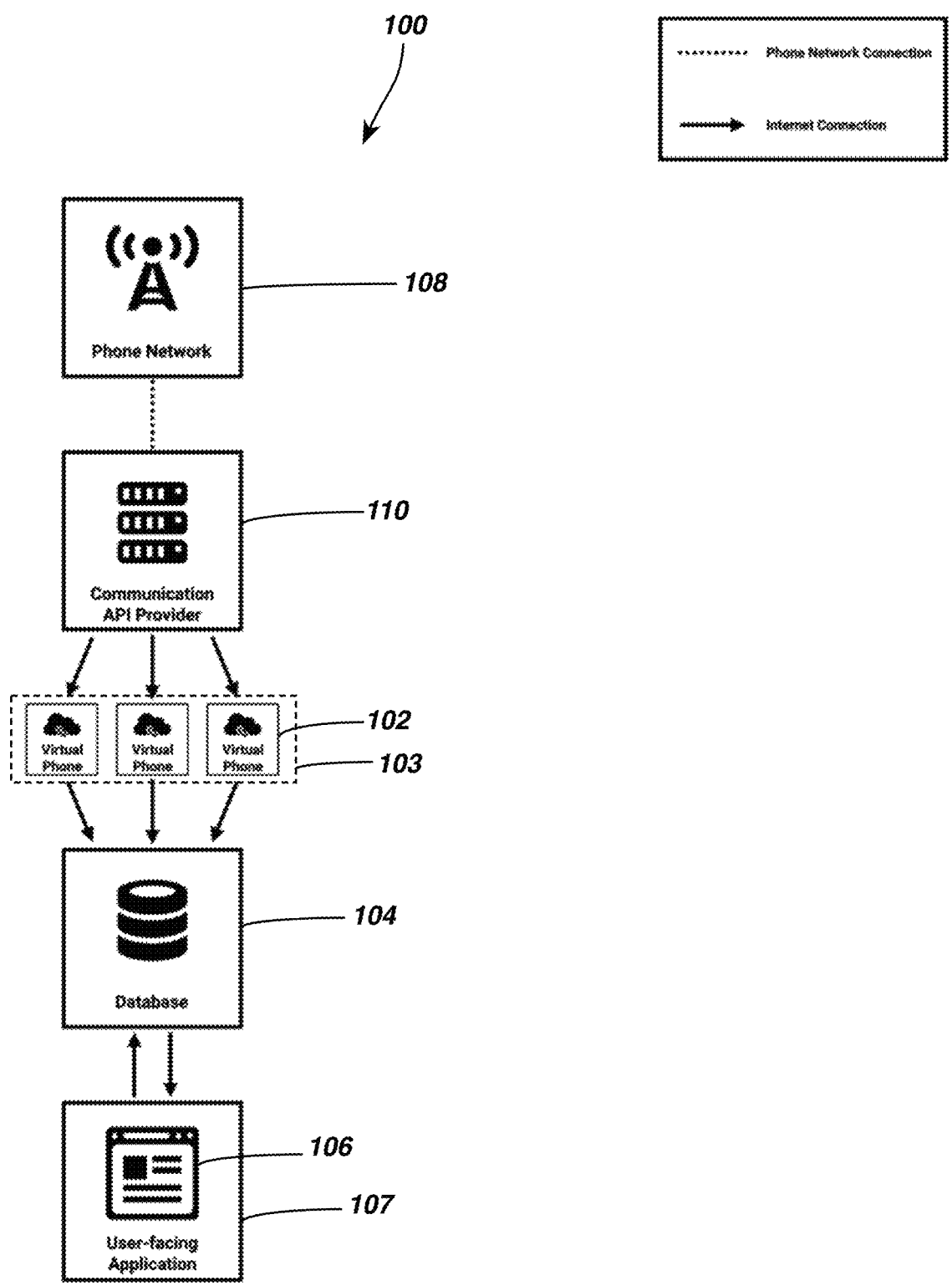
FIG. 3 shows a flow chart of a system and method for using a virtual phone to receive a two-factor authentication message according to one embodiment of the present disclosure.
Figure 4:
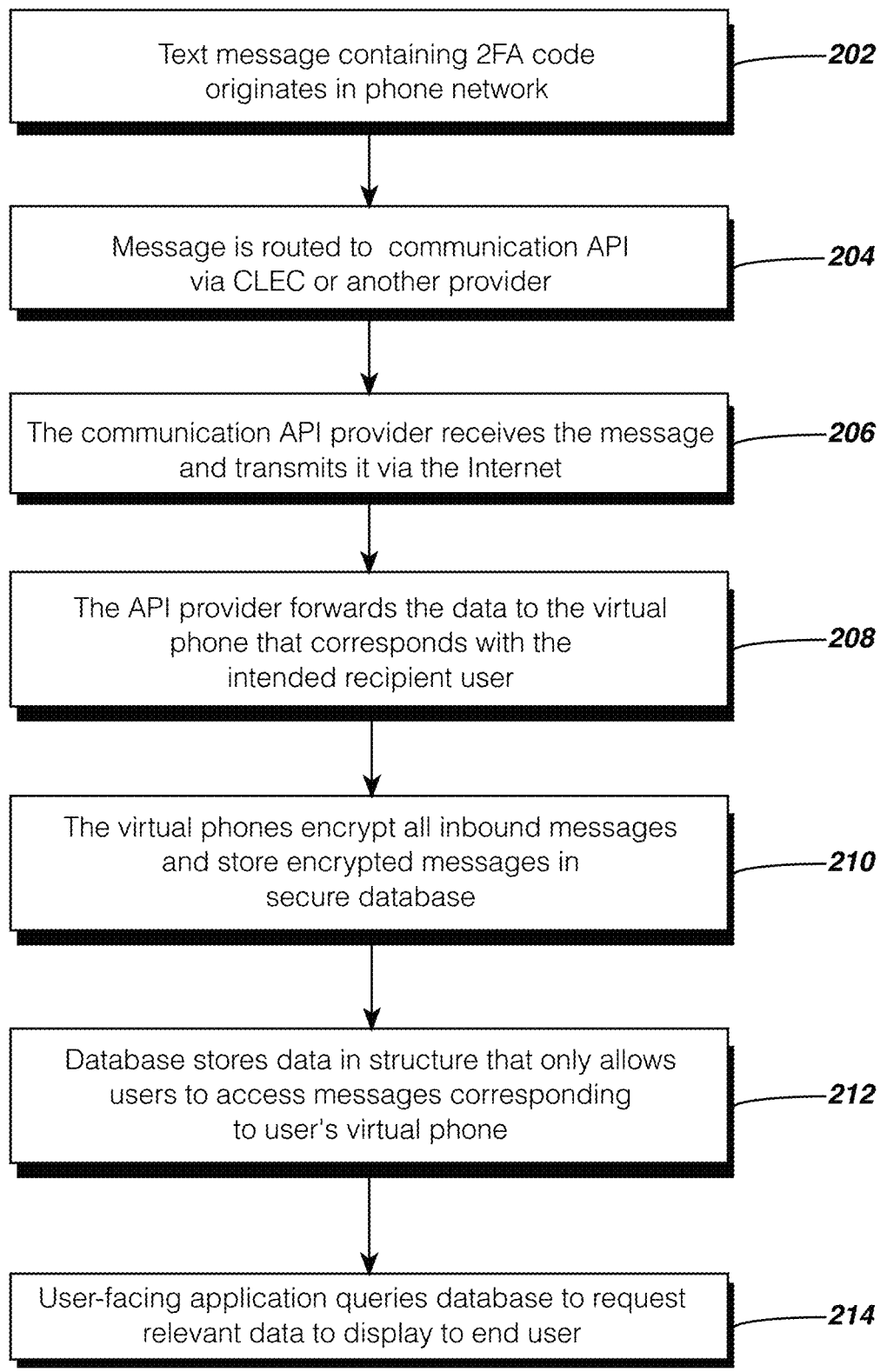
FIG. 4 shows a flow chart of a method for using a virtual phone to receive a two-factor authentication message according to one embodiment of the present disclosure.
Figure 5:
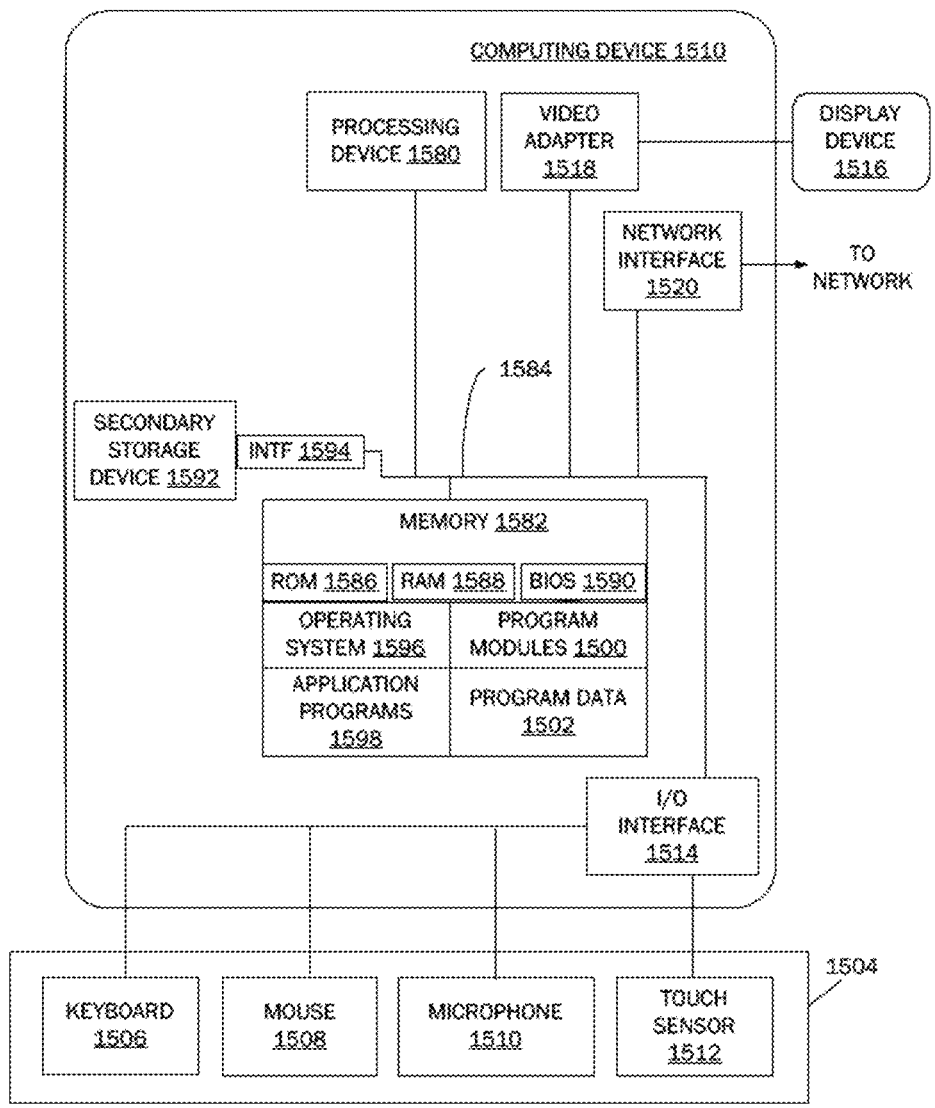
FIG. 5 shows a schematic diagram of an exemplary user computing device according to one embodiment of the present disclosure.

FIGS. 3 and 4 show a basic embodiment of a virtual two-factor authentication system 100 using one or more virtual phones 102 implemented on a server 103 using virtualization technology and in communication with a database 104. The system of virtual two-factor authentication 100 also includes a user-facing application 106 residing on an application server 107 and displayed on a user computing device 1510 (FIG. 5). The user-facing application 106 is also in communication with the database 104. During a two-factor authentication process, an inbound SMS text message including a second factor authentication code is routed to the database 104 from a phone network 108 to a communication API provider 110 over a phone connection. The inbound message is then transmitted from the communication API provider 110 to the one or more virtual phones 102 over a network connection. Data corresponding to the inbound SMS message is stored on the database 104 and is associated with one of the virtual phones 102 such that data of the inbound SMS message is accessible by a user through the user-facing application 106.

While the above description and other portions of this disclosure refer to SMS two-factor authentication methods, it is also understood that embodiments of the present disclosure may be suitable with other various verification methods. For example, embodiments of the present disclosure may be compatible with and include voice-to-text processes, such as the transmission of a verification code in a voice call to a user. Embodiments of the present disclosure may be compatible with or employ voice-to-text such that a verification code provided in a voice message is translated to text and recognized according to embodiments of the present disclosure. An audio file may be generated that includes the verification code, or text-to-speech methods may be used to translate the voice message into text for identification of the verification code as described herein.

Referring to FIG. 4, in step 202, a text message containing a two-factor authentication code originates in a phone network. The message is routed to the communication API provider via a competitive local exchange carrier ("CLEC") or by another communication API provider (step 204). In step 206, the communication API provider receives the message and transmits the message via the Internet. The API provider forwards the data to one of the virtual phones 102 corresponding to the intended recipient of the message, as discussed in greater detail below (step 208). The message is encrypted after being received by the virtual phone 102 and stored in the database 104 in step 210. In step 212, the database 104 stores the encrypted message data in a structure that allows access to the message data only by a user corresponding to the virtual phone 102 on which the message was received. In step 214, the user-facing application 106 queries the database 104 to request relevant message data to display to the user.

A user creates a user account including at least one corresponding phone number using the user-facing application 106. The user-facing application 106 may reside on a server, and all or portions of the user-facing application are accessible by a user through a user device in communication with the server hosting the user-facing application. Suitable user devices include a display, a processor, memory, and one or more input devices for receiving input from a user on the user device, as shown in FIG. 5. The computing device 1510 includes, in some embodiments, at least one processing device 1580, such as a central processing unit (CPU). A variety of processing devices are available from a variety of manufacturers, for example, Intel or Advanced Micro Devices. In this example, the computing device 1510 also includes a system memory 1582, and a system bus 1584 that couples various system components including the system memory 1582 to the processing device 1580. The system bus 1584 is one of any number of types of bus structures including a memory bus, or memory controller; a peripheral bus; and a local bus using any of a variety of bus architectures.

A user device may include, for example, a smart phone, tablet, or personal computer of the user. The user-facing application is displayed on the user device such that the user may interact with the user-facing application using the display and one or more input devices of the user device. A user accesses the user-facing application on the user device via a web browser or through a locally installed application installed on the user device that is in communication with the user-facing application server. A user logs in to the user-facing application using a created username and password, as described in greater detail below. To further protect the user account from being compromised, user log in information may also require two-factor authentication or other available methods of computer access control. For example, when the user device comprises a smartphone, a user log in process may require verification of an identity of the user using biometric data, such as a fingerprint of the user acquired through a fingerprint sensor of the user device.

Figure 6:
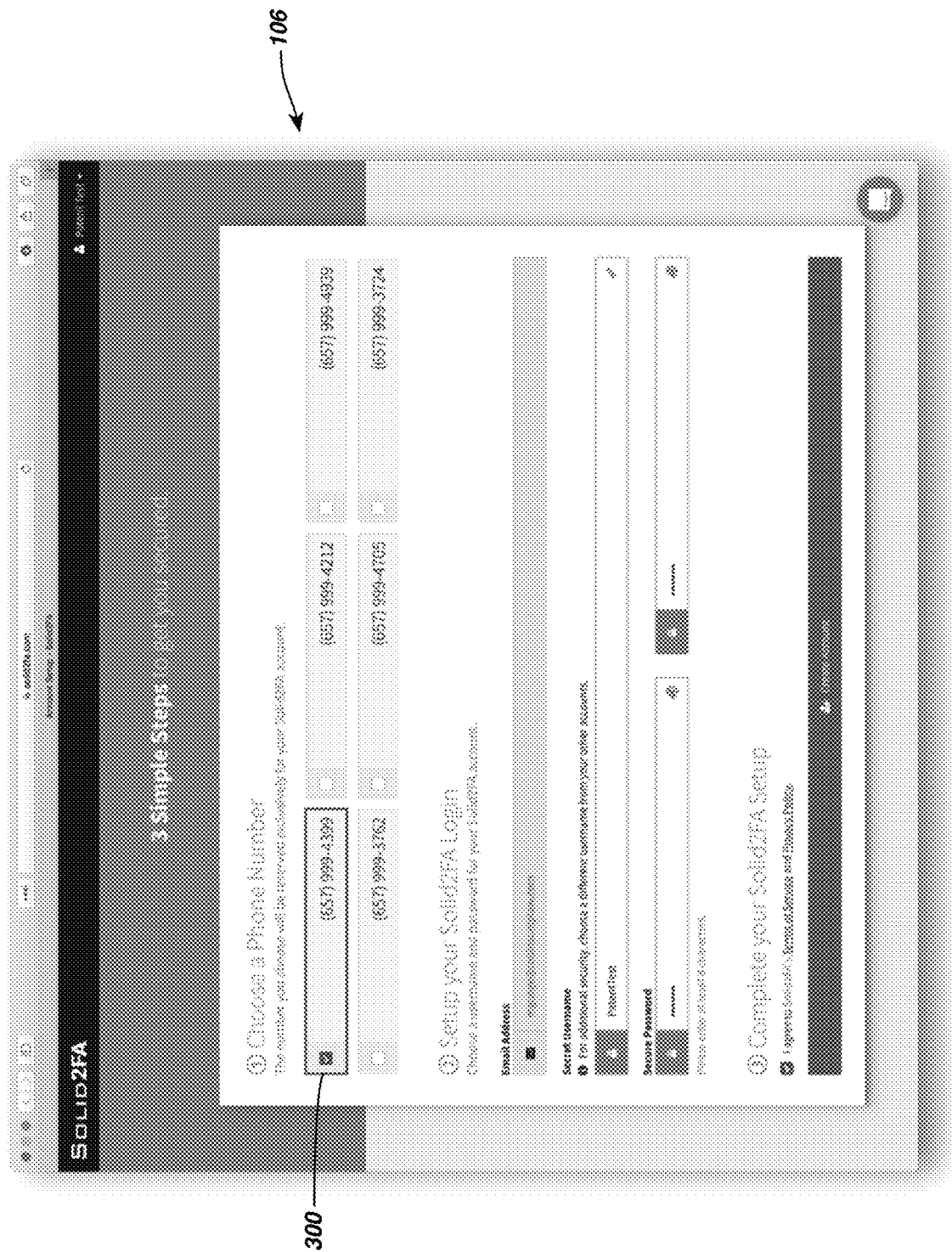
FIGS. 6-8 show a process of establishing a user account according to one embodiment of the present disclosure.

Referring to FIG. 6, a set up page of a user-facing application is shown wherein a user may create a new account and virtual phone associated with the user's account. In a first step, the user first selects a phone number 300 for one of the virtual phones 102. During a set up process, multiple available phone numbers 300 are displayed to the user on the user-facing application 106. The phone numbers are selected from one of a plurality of available phone numbers available to users, which may be retrieved from the communication API provider 110. The user also creates a username and password, and enters an email address of the user during the set-up process. After entering user information and selecting a phone number 300, a profile of the user is created and stored on a server. A virtual phone of the user is also created and stored on the server, the virtual phone having the phone number 300 selected by the user during the set-up process. When the phone number 300 is selected by the user, the system requests and registers the phone number 300 from a phone network so that the phone number is reserved for use with the virtual phone of the user. The above description of setting up a virtual phone is an exemplary process, and it is also understood that various other steps may be implemented to set up a virtual phone.

Figure 7:
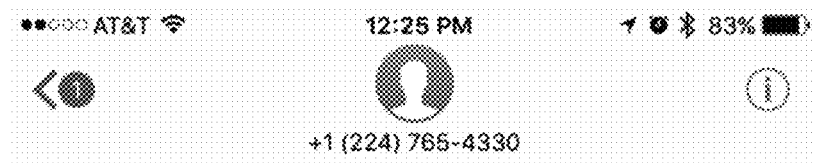
Figure 7:
Figure 8:
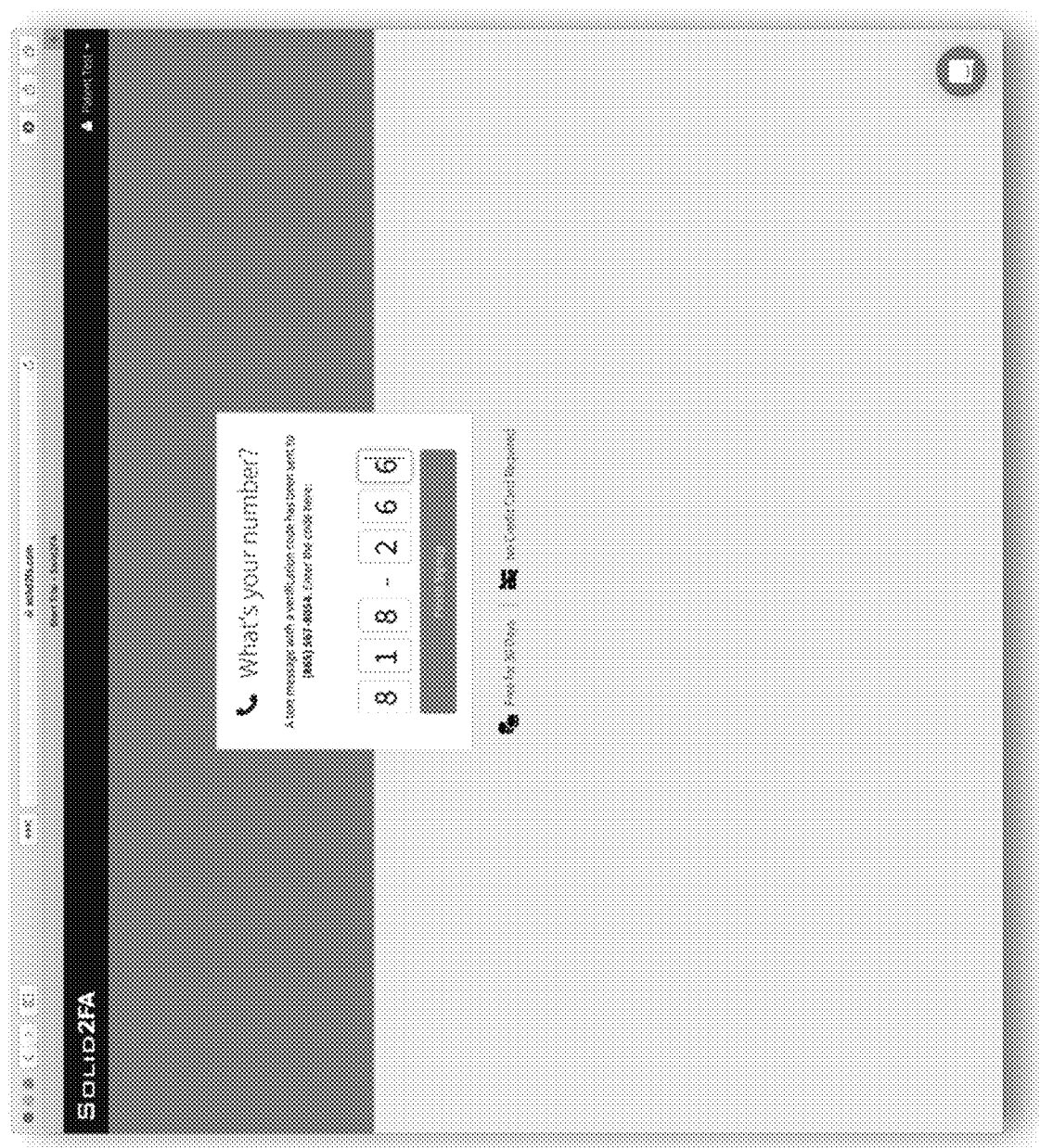

In one embodiment, during a process of creating a user account and a virtual phone associated with the user, the user is prompted to enter a phone number corresponding to a cellular phone of the user. A verification code is transmitted from a server to the user's cellular phone for verification, and the user inputs the received verification code to confirm an identity of the user and to prevent duplicate user signups or overloading of the system, as shown in FIGS. 6-8. The process described above and shown in FIGS. 6-8 is one of many known methods that could be used to enhance security during a signup process of a user.

Figure 9:
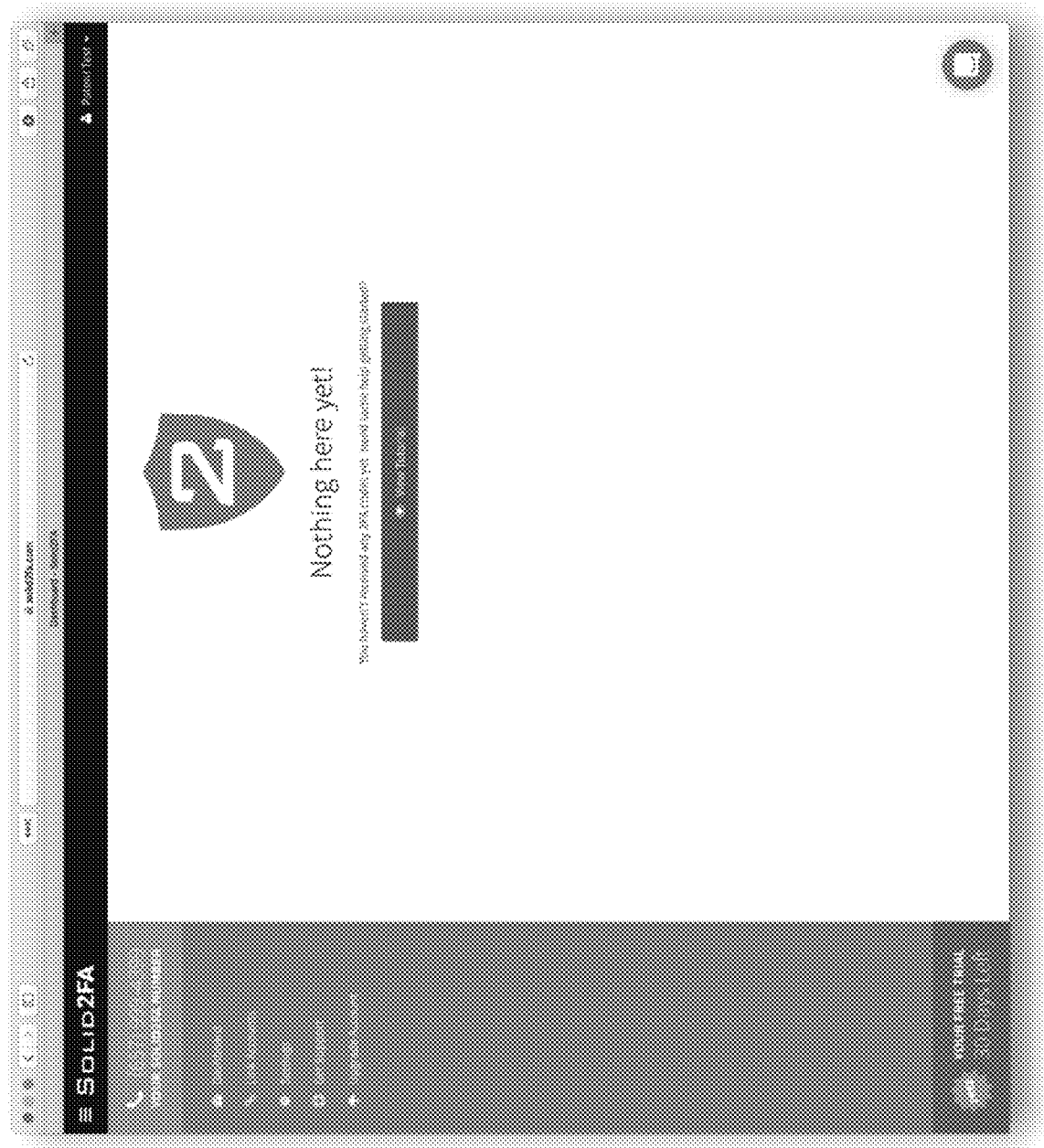
FIG. 9 shows a dashboard of a user-facing application of a system of virtual two-factor authentication according to one embodiment of the present disclosure.

When a user logs in to the user-facing application via a user device, a dashboard 302 (FIG. 9) is displayed to the user that includes the user's virtual phone number 300. A user interface includes links to sections for the user to link accounts for two-factor authentication, settings, and other available features of the user-facing application. The dashboard 302 of the user-facing application also displays recent alerts or messages related to messages received by the virtual phone associated with the user, as shown in FIG. 9.

Figure 10:
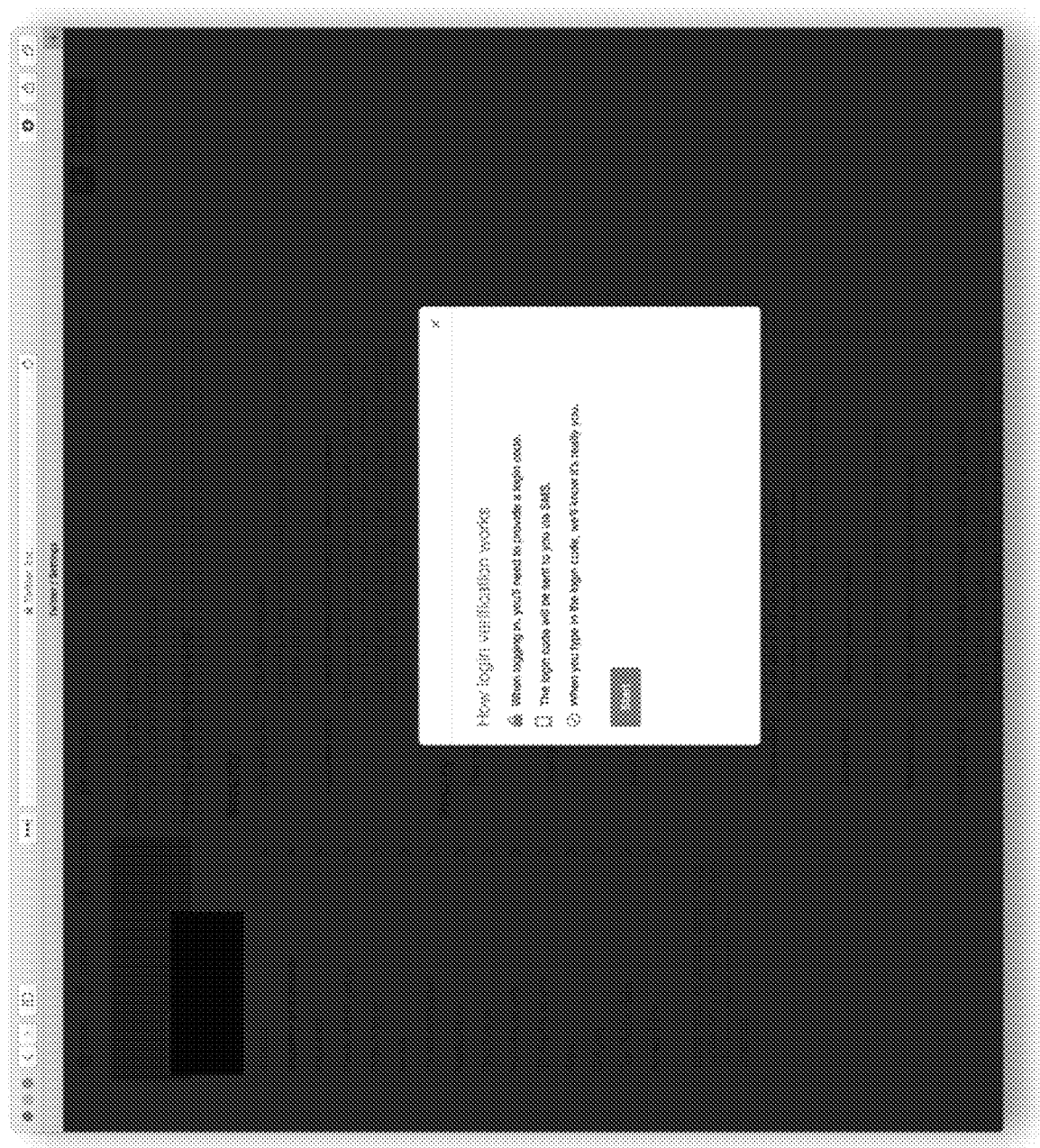
FIGS. 10-13 show a process of initially setting up virtual two-factor authentication according to one embodiment of the present disclosure.
Figure 11:
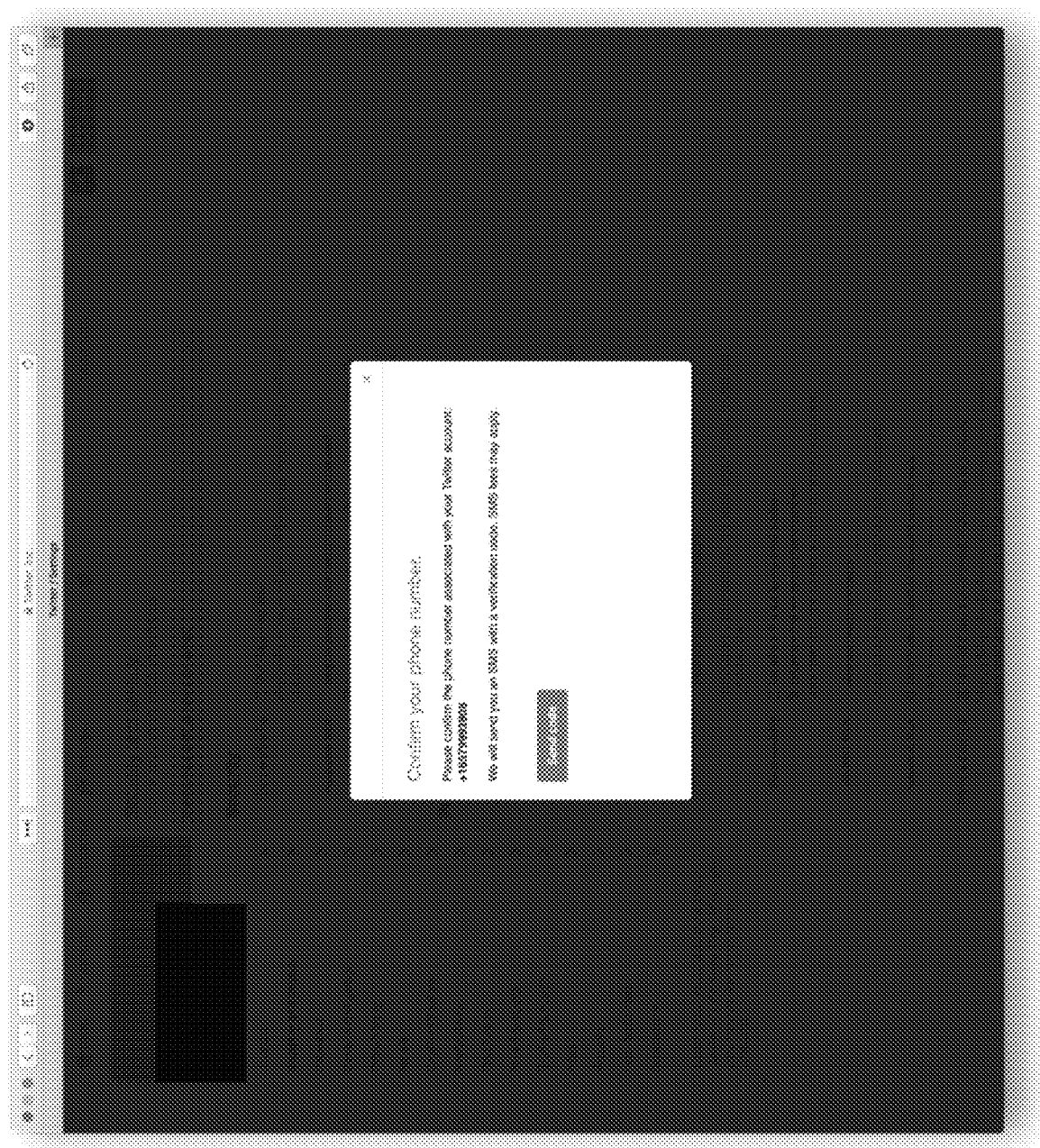
Figure 12:
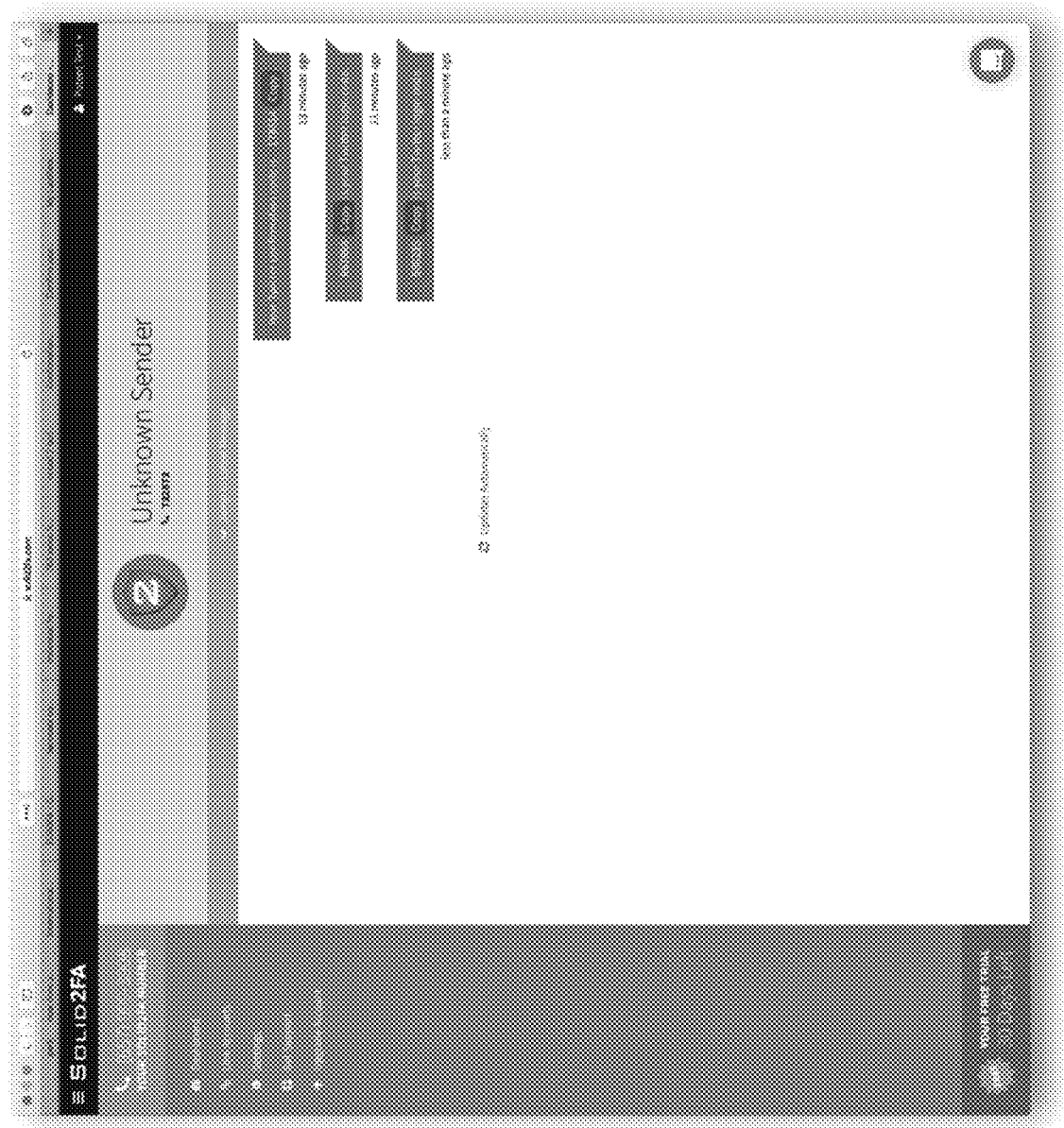
Figure 13:
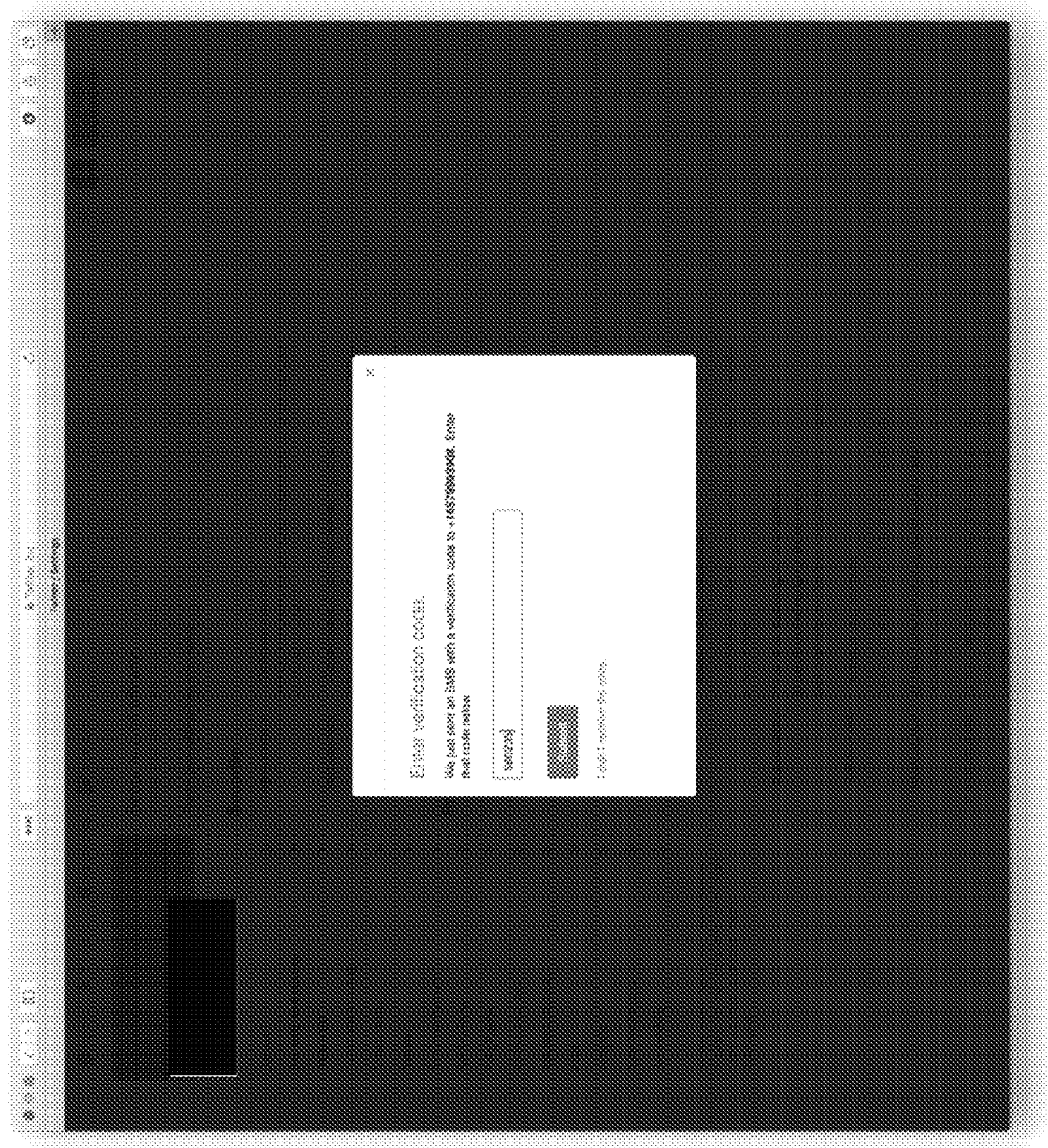

Referring now to FIGS. 10 and 11, a user activates two-factor authentication on one or more external accounts of a user, such as a social media account of the user. During a set up process of two-factor authentication, a phone number is requested from the user for transmitting the second factor code. A user inputs the phone number of the user's virtual phone and a verification code is transmitted to the user's virtual phone. As shown in FIG. 12, the user may view the verification code transmitted to the user's virtual phone on the user-facing application. In one embodiment, an algorithm of the system for virtual two-factor authentication locates a numerical or alphanumerical code within an incoming message and isolates the code such that the user may simply copy and paste the code into an input field of a service that the user is attempting to log in to (FIG. 13). In another embodiment, a browser extension may be installed locally on the user device such that a received code on the system is automatically inputted into the second factor authentication field of an outside service. After the second factor authentication is inputted, the user is then able to successfully log in to the service.

The communication API provider is preferably configured to receive messages containing two-factor authentication codes from both traditional phone numbers and from short codes. Short codes typically refer to messages that originate from phone numbers that are 5 or 6 digits in length as opposed to "long code" 10-digit phone numbers used in the U.S.

Referring again to FIG. 3, when a user attempts to log in to a service using two-factor authentication and the system for virtual two-factor authentication of the present disclosure, a text message containing a two-factor authentication code is originated by the service and transmitted over a phone network to the virtual phone number of the user. The authentication code may originate from a database or server of the service before being transmitted to a communication API provider of the service over a network before reaching the phone network. The transmitted code is routed to the communication API provider and then transmitted to one or more servers hosting the virtual phones. The message is forwarded to a virtual phone associated with a receiving phone number of the message. Data from the received message is stored on a database and is accessible by the user via the user-facing application. An alert or push message may be transmitted to the user, such as on the user device, to alert the user that the virtual phone has received a message.

In one embodiment, the system of virtual two-factor authentication may identify or recognize an identity of the party transmitting the message including the authentication code. For example, a phone number commonly used by a transmitter of an authentication code may be recognized by the system as corresponding to a number used by the transmitting entity. In another example, an algorithm may recognize text or other content of the transmitted authentication code to determine an identity of the entity transmitting the code. If a message includes an authentication code and text, such as "Your Facebook login code is 12345," an identity of the transmitting entity may be recognized from the text even if the number from which the transmission authenticated is unknown. When a transmitting phone number is recognized, the message displayed to the user including the authentication code includes identifying information such as a name of the transmitting entity.

Figure 14:
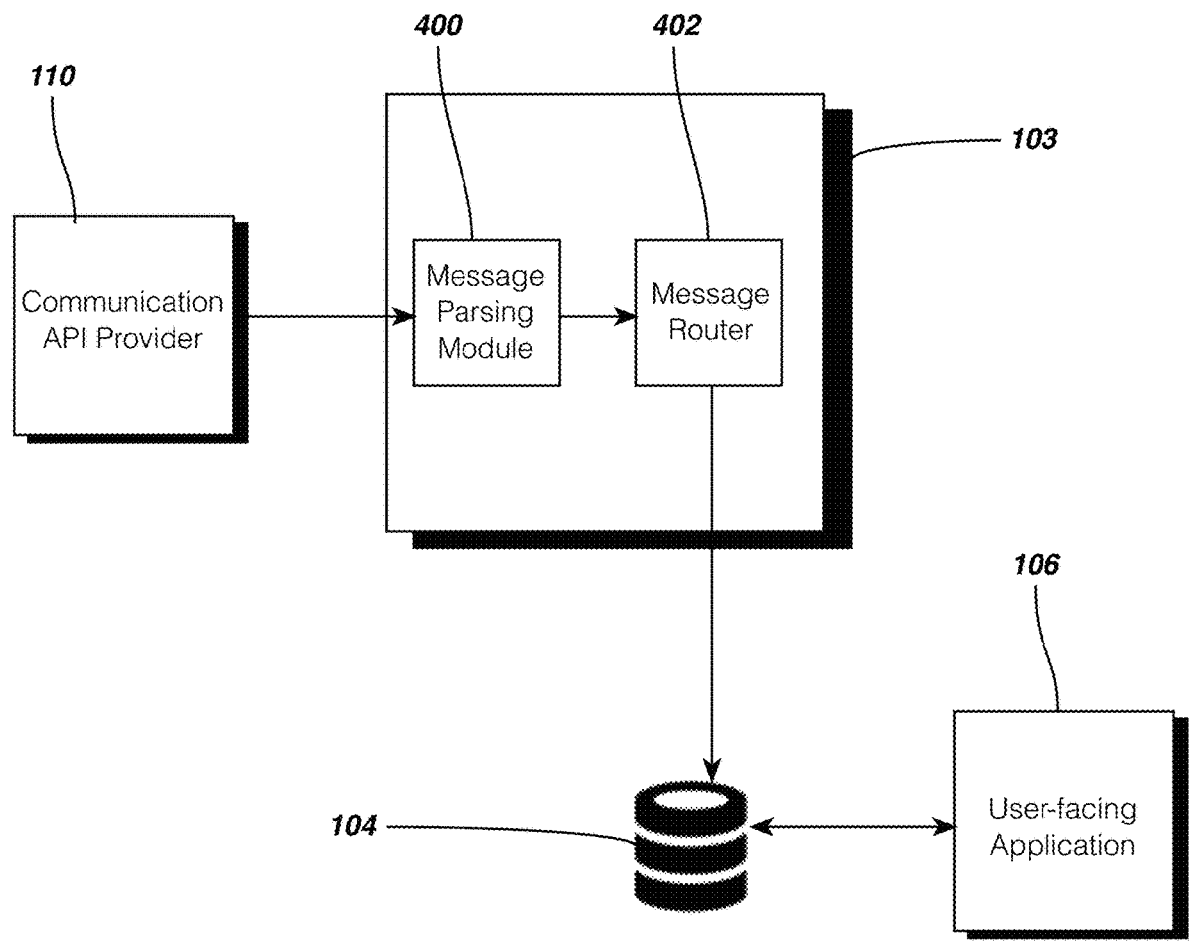
FIG. 14 shows a diagram of a system and method for receiving a two-factor authentication message according to one embodiment of the present disclosure.
Figure 15A:
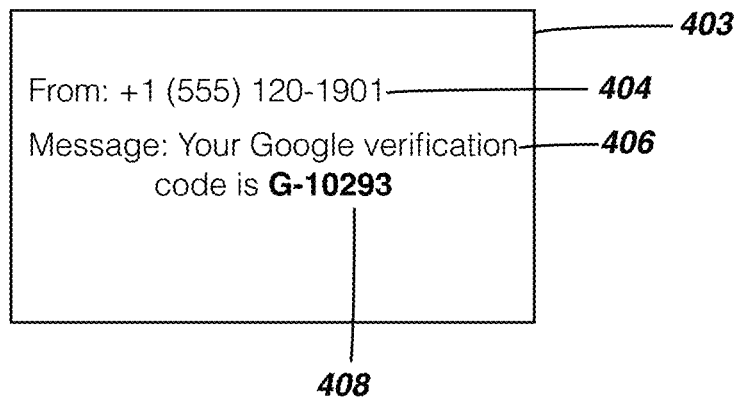
FIGS. 15A-15B illustrate data received in an authentication message on the two-factor authentication system according to one embodiment of the present disclosure.
Figure 15B:
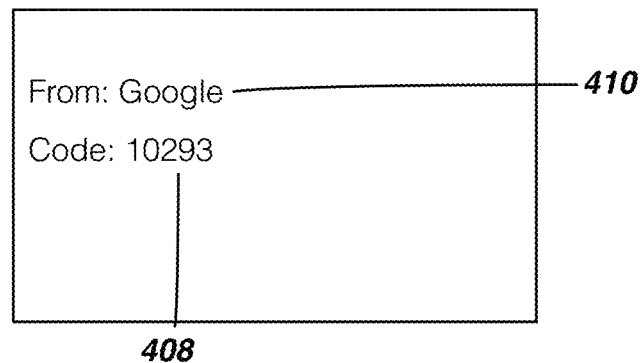

Referring now to FIG. 14, the system of virtual two-factor authentication 100 may identify an authentication code, such as a two-factor authentication code, within a text message received by the virtual phones. When a message is received from the communication API provider 110, the received message is analyzed with a message parsing module 400 to identify content of the message and to extract an identification code and other data of the received message. A message router 402 associates the received message with one of the virtual phones based on a destination phone number of the received message. The received message is further analyzed with a message parsing module 400 to identify content of the message and to extract an identification code and other data of the received message. As shown in FIG. 15A, a received message 403 may include information including an original phone number 404 and message content 406 including an authentication code 408. The message parsing module 400 analyzes the received message and its content and extracts data from the message including identification of a sender 410 and the authentication code 408, as shown in FIG. 15B.

Figure 16:
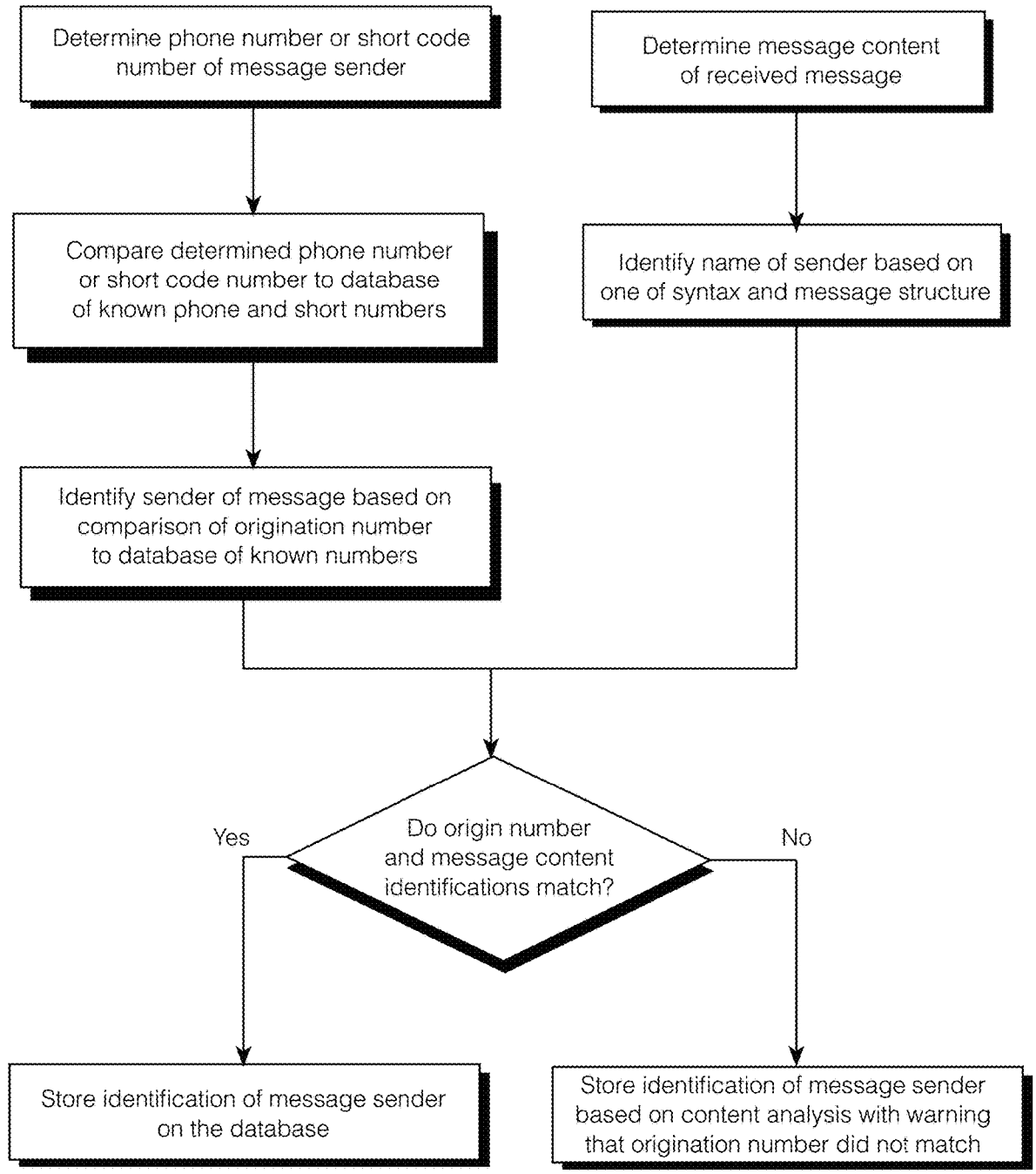
FIG. 16 shows a flow chart of identification of an authentication code and source of an authentication message according to one embodiment of the present disclosure.

The message parsing module 400 analyzes content of the received message to identify both the origin of the message and an authentication code contained within the message. Referring to FIG. 16, the message parsing module 400 preferably analyzes both an origination number (phone number or short code number) and content of the message to determine an origin of the received message. To identify an origin of the message based on the original number, a phone number or short code number of the received message is determined. After determining the phone number or short code number of the received message, the number is compared to a plurality of known phone numbers and short code numbers stored on the database 104 of the system of virtual two-factor authentication 100 or with a third-party database of known phone numbers and short code numbers. For example, the database may maintain a list of short code numbers that are known to be associated with a particular sender of an authentication code, as illustrated in Table 1 below. For example, if an origination number of the received message is identified as the short code of 23333, the sender of the authentication message is identified as Google.

TABLE 1

| Short Code | Service |
|---|---|
| 40404 | Twitter |
| 23333 | Google |
| 44154 | Amazon |
| 24021 | Visa |
| . . . | . . . |

The system of virtual two-factor authentication 100 may further analyze an identity of a sender of the authentication message based on a content of the message. Analysis of the message content may occur in parallel to the process of determining the sender of the message based on the phone number or short code number, and a result of the two processes may be reconciled as described in greater detail below. Content of the received message is analyzed to recognize a sender of the message based on syntax of the message content or a structure of the content of the message.

In one method, the message parsing module 400 determines an identity of the sender of the authentication message by comparing syntax of the message content with a plurality of known message contents stored on the database 103 or on a third-party database. For example, Table 2 below lists a number of known message syntax structures stored on a database. A placeholder (shown as % N) may be used for the portion of the message that would change depending on the user, such as the authentication code. When the message is received, the parsing module 400 compares the syntax of the message content to the known syntax structures on the database to match the message syntax with the syntax of a known sender of authentication messages. In this method, the message is not required to list a name of the sender of the authentication message. For example, a received authentication message having content of "Your Security Key One Time Pin (OTP) is 12345" may be identified as a message from PayPal if the syntax matches a known syntax for authentication messages from PayPal, even though the message content does not expressly use the name "PayPal."

TABLE 2

| Service | Syntax |
|---|---|
| Google | Your Google verification code is %N%N%N%N%N%N |
| Google | G-%N%N%N%N%N%N is your Google verification code. |
| Facebook | %N%N%N%N%N%N is your Facebook confirmation code. |
| Twitter | Your Twitter confirmation code is %N%N%N%N%N%N. |
| Microsoft | Use %N%N%N%Nas Microsoft account security code. |
| . . . | . . . |

In another method, content of the received authentication message may be analyzed to determine a sender of the authentication message without comparing the message content to a database, such as by identifying a name of the service from which the authentication message originated. The message parsing module 400 may recognize common formats of authentication messages along with commonly used terms of authentication messages to intelligently identify the sender of the message. For example, a message including the content "Your Instagram login security code is 978356" may be received on the message parsing module 400. This example message follows one of a finite number of known and common authentication message structures, such as "Your _____ {login|access|security} code is" The message parsing module would recognize that "Instagram" is the relevant word identifying the originator of the authentication message.

In another example, a message including "Use 192056 to access your SendGrid account. This code expires in 5 minutes." is received on the message parsing module 400. Although the content is in a less commonly used format, the message parsing module 400 may remove terms recognized as not identifying a sender of the message, such as "to", "your", "this", and "in". Additional terms such as "access", "account", and "code" may also be included among commonly used terms recognized by the message parsing module 400 as not identifying the sender of the message. This method leaves "SendGrid" as the only remaining term that would identify the sender of the authentication message.

In yet another example, an authentication message including content of "GeckoBoard security code: 12345. Download our app for faster logins." may be received by the message parsing module 400. If other methods are unable to identify a sender of the authentication message, the message parsing module 400 will analyze capitalized terms within the message, such as after discarding any terms identified to be ordinary dictionary terms. Thus, in this example, the term "GeckoBoard" would remain and be identified as the sender of the authentication message.

The message parsing module 400 may further resolve any conflicts existing between identification of the sender based on the origination number and identification of the sender based on content of the message. For example, if an authentication message includes content of "Your Facebook login code is 12345" but the message originates from a phone number or short code not identified as a known origination number of Facebook, a conflict exists between the two identification methods. The message parsing module 400 may resolve the conflict by electing one of the identifications while adding a warning to the determined identification that a conflict existed. For example, in a preferable embodiment the message parsing module 400 will identify the sender of the authentication message based on the content of the message as analyzed by the message parsing module. However, if the identified origination number is not recognized, the message parsing module 400 will add a warning that is visually displayed to the user on the use-facing application 106 that a conflict exists to aid in preventing a potential fishing attack.

The message parsing module 400 further identifies an authentication code within the content of the authentication message. The message parsing module 400 may use one or more methods to identify the authentication number within the content of the authentication system. For example, an authentication message may be received on the message parsing module 400 that includes "Your Facebook two-step login code is 123456." The message parsing module 400 will recognize that the authentication code is a numerical value, and identify the numerical code as the authentication code. In another example, an authentication code includes content of "Your 23andMe access code is 481902." The message parsing module 400 will recognize that the numerical value of "23" is too short to be an authentication code, and will ignore numerical content that is too short to comprise an authentication code.

In yet another example, when multiple numerical codes are detected with the content of an authentication message, the message parsing module 400 may discard any numerical codes recognized by the message parsing module 400 as not corresponding to an authentication code. For example, if an authentication message includes content of "Your Twitter two-step code is 129456. SMS 40404 to tweet.", the message parsing module 400 will recognize that "40404" is a short code corresponding to Twitter, and therefore ignore that numerical code. In another example, the message parsing module 400 may combine adjoining numbers to form the authentication code. If an authentication message is received including content of "Use 978 356 as your Instagram security code.", the message parsing module 400 will recognize that will each 3-digit number would be too short to form an authentication code, the two numbers combined would form a commonly-used 6-digit authentication code. Finally, in some embodiments the message parsing module 400 employs a method of recognizing dictionary terms that should be discarded from forming any part of an authentication code.

The message parsing module 400 of the virtual two-factor authentication system 100 preferably includes self-learning to improve identification of a sender of an authentication message and content of the authentication message. The message parsing module 400 improves identification of authentication messages such as by relying on data received from a plurality of users through the user-facing interface 106 of the virtual two-factor authentication system 100. For example, when a user logs in to the user's account through the user-facing interface 106, the user may add a new account associated with the user. The user selects the service that the user is adding when creating a new account. If the virtual two-factor authentication system 100 subsequently receives an authentication message destined for the user who recently created the new service, the virtual two-factor authentication system recognizes the authentication message as being from the recently added service and will correlate the two events. Further, the origin number, syntax, and structure of the authentication message may be recognized by the message parsing module 400 and stored such that when future users receive a message that is similar to the new message, the message will be identified for those users as corresponding to the new service.

In one embodiment, the two-factor authentication system 100 further improves identification of a sender of an authentication message based on user input through the user-facing interface 106, such as when the users re-name a sender of an authentication message after it has been identified by the message parsing module 400. For example, if an authentication message identified as originating from a first entity is commonly re-named by users as being from a second entity, an alert may be generated, and in one embodiment the name automatically updated to indicate that the message comes from the new entity.

In one embodiment, a user may set up additional authentication means of services accessed by the user that are associated with the user account. For example, the user may create a new service and elect to use a time-based one-time password (TOTP), wherein the TOTP code is displayed to the user on the user-facing application along with authentication codes received on the virtual phones. Other various authentication methods may be used, such as HMAC-based one-time passwords (HOTP), or other methods of authenticating a user account.

In another embodiment, the user-facing application 106 may be implemented on as a plug-in on a browser of a user device. For example, a browser plug-in or other local application installed on a user device may allow authentication codes of the user to be directly inputted into a field of a web site displayed on a browser of the user device. The browser plug-in may further incorporate data of the user, such as the user's username and password, for inputting the data into fields of a web site with the user's authentication code.

In one embodiment, an application may be installed locally on a smart phone of the user. The application may forward any text messages received on the smart phone to the two-factor authentication system 100 such that any authentication codes received on the user's smart phone are associated with the user's account on the two-factor authentication system 100.

Pooling of Virtual Phones

Figure 17:
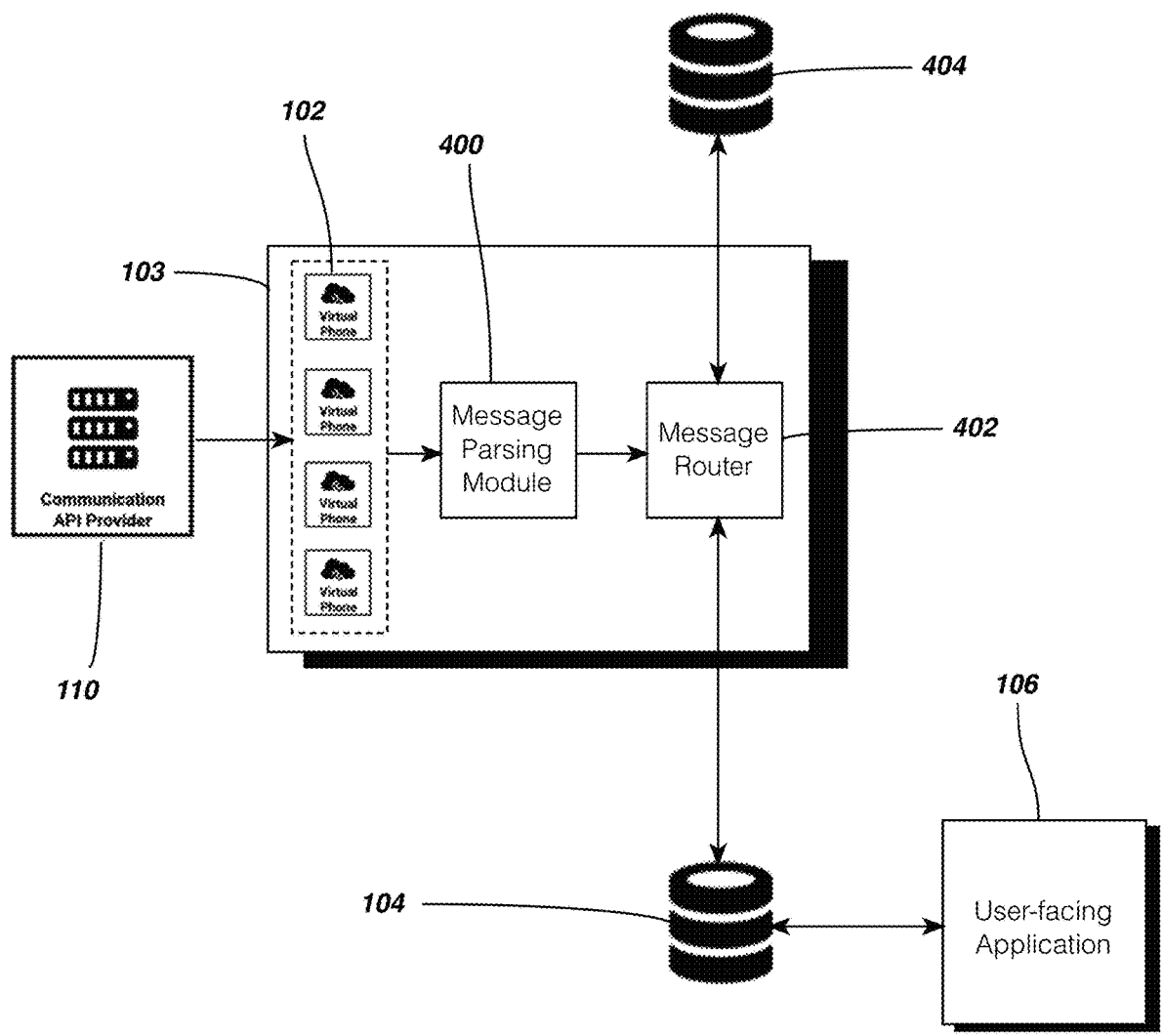
FIG. 17 shows a two-factor authentication system including a pooling database according to one embodiment of the present disclosure.

Above descriptions of the two-factor authentication system 100 describe a process that includes associating a user account with one of the plurality of virtual phones 102. Additional embodiments of the two-factor authentication system 100 enable multiple users to be associated with one or more of the virtual phones 102 to reduce a number required virtual phones and therefore a number of phone numbers required to be assigned to the virtual phones 102. Referring now to FIG. 17, authentication messages are received on the virtual phones 102 from the communication API provider 110. The authentication message is analyzed by the message parsing module 400 to identify content of the authentication message and an origin of the authentication message as described above. The authentication message further includes a destination phone number corresponding to one of the virtual phones 102. Data of the authentication message, including the destination phone number, is analyzed by the message router 402 to determine a destination of the authentication message data. The message router 402 analyzes the destination phone number of the received authentication message and queries a pooling database 404 to determine which user account the authentication message should be associated with. While FIG. 17 illustrates separate databases including database 104 and the pooling data base 404, it is understood that both the database 102 and pooling database 404 may be implemented as a single database.

Figure 18:
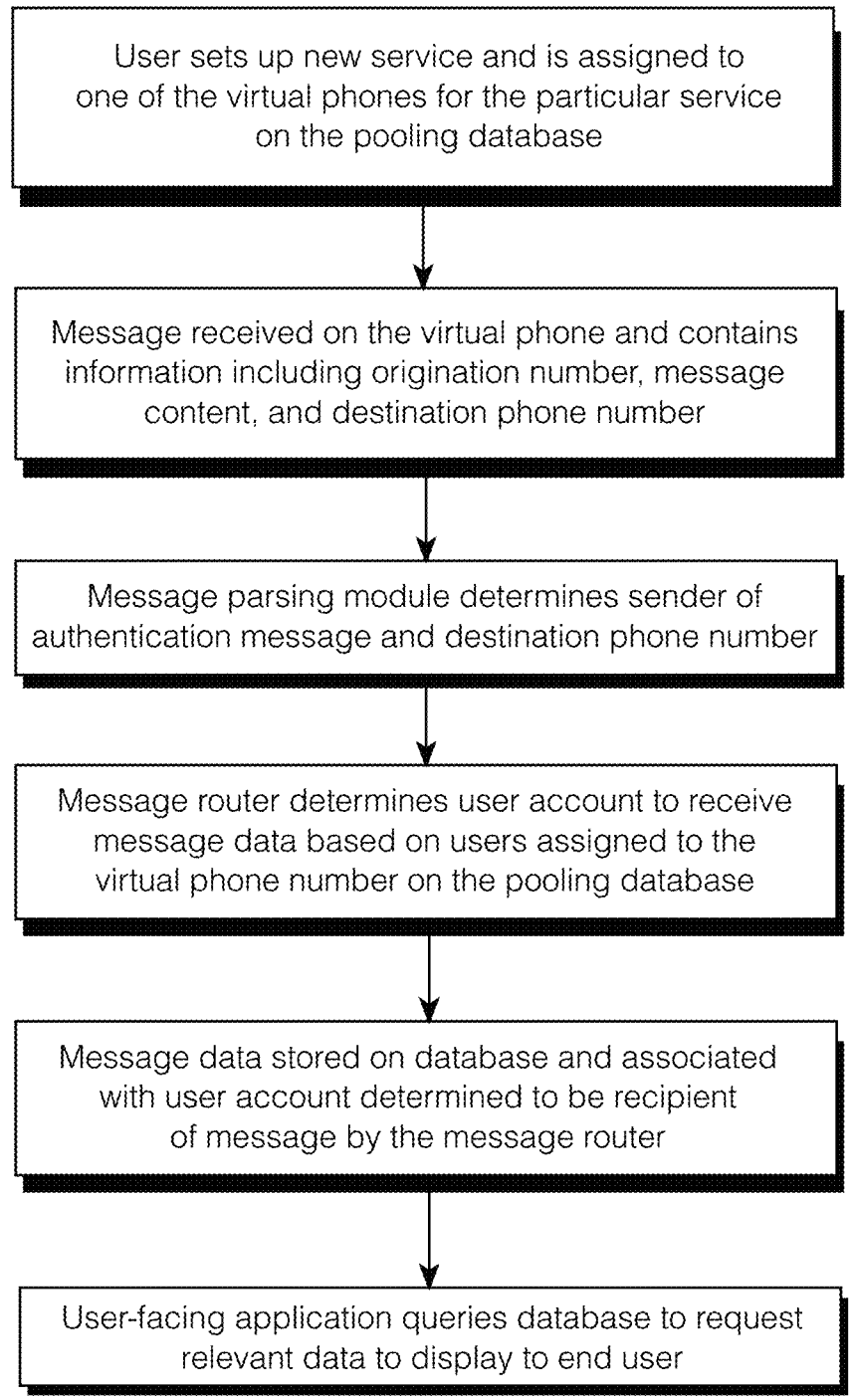
FIG. 18 shows a flow chart of pooling of user accounts on virtual phones according to one embodiment of the present disclosure.

Referring now to FIG. 18, a user account may be pooled with other user accounts such that a plurality of users is associated with one of the virtual phones 102. As shown in FIG. 18, the user may access the user-facing application 206 to associate a service of the user with one of the virtual phones. The user selects an account to add for authentication using the two-factor authentication system 100. After the user selects a service, the user is assigned a phone number corresponding to one of the virtual phones for that service.

When a user account is pooled, the pooling database 404 stores data related to an identification of users assigned to each of the virtual phones and a service of each user associated with the virtual phones. For example, data on the pooling database may be structured as shown in Table 3 below. The two-factor authentication system 100 may designate certain of the virtual phones for use with the pooling of user accounts and services. As shown in Table 3 below, each of the virtual phones and corresponding telephone number may be associated with multiple user such that each user is associated with a service that is distinct from services used by other users with each phone number. Further, pooling of users with the virtual phones 102 reduces a total number of virtual phones and corresponding virtual phone numbers required for a number of users. As shown in the example of Table 4 below, 6 users are pooled such that only 3 virtual phones and virtual phone numbers are required.

TABLE 3

| Virtual Phone Number | Service | User |
| --- | --- | --- |
| +1 (555) 120-1901 | Google | Bob |
|  | Facebook | Mary |
|  | Twitter | John |
| +1 (555) 120-1902 | Google | Null |
|  | Facebook | Bob |
|  | Twitter | Jane |
| +1 (555) 120-1903 | Google | Joe |
|  | Facebook | Greg |
|  | Twitter | Bob |

When the user sets up a new service using the user-facing application 206, the pooling database 204 is queried to provide an available virtual phone number for the particular service being requested by the user.

Referring to FIG. 18, an authentication message is received by the virtual phones. The authentication message includes information as described above, including message content, an origination number (phone number or short code number), and a destination phone number of the message. The message parsing module 400 analyzes the message to determine an identity of the sender of the authentication message. Analysis of the message to determine the identity of the sender of the authentication message may be performed according to embodiments already described herein. The message parsing module may further identify a destination phone number of the authentication message.

Data from the message parsing module 400 is received by the message router 402 to determine a destination of data associated with the authentication message. The message router 402 examines the destination phone number and sender of the authentication message to determine a user account intended to receive the data from the authentication message. For example, referring to Table 3 above, if the message router 402 identifies that a destination phone number of a message is +1 (555) 120-1902, and that a sender of the authentication message is Facebook, the message router 402 would associate the authentication message with user Bob on the database 104. In another example, a message to the same destination number but identified as sent from Twitter would cause the authentication message to be associated with user Jane on the database 104. The user may then access data of the message, including the authentication code, through the user-facing application 106.

Audit Trail History

Embodiments of the two-factor authentication system 100 described herein may include the ability to track actions of a user and create an audit trail showing an identification of users accessing received authentication codes and other actions of users accessing the two-factor authentication system 100 on the user-facing application 106. For example, user events that may be logged include a type of account accessed by a user (such as Facebook, Google, etc.), the type of event that occurred (such as sharing of an account with another user), event metadata including identification of users with which authentication data is shared, type of user corresponding to the event (such as either an administrator, owner, or shared user), timestamp data of an event, and IP address data of users.

In one embodiment, the two-factor authentication system 100 may include a corporate user account wherein multiple user accounts are associated with the corporate account. The multiple user accounts may correspond to employees of the company. The two-factor authentication system 100 may store an audit trail of users associated with the corporate account to determine which users accessed particular services. For example, when a user adds a new service to the user account (such as Facebook, Google, etc.), the action of adding a new service may be logged and stored using the two-factor authentication system 100. Similarly, when a user removes or deletes a services from the user account, the event of deleting the service is logged.

Figure 19:
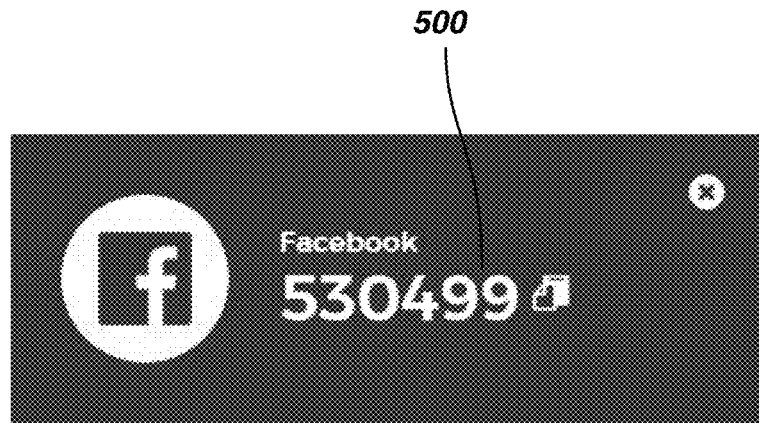
FIGS. 19 and 20 show concealment of an authentication code on a user-facing application according to one embodiment of the present disclosure.
Figure 20:
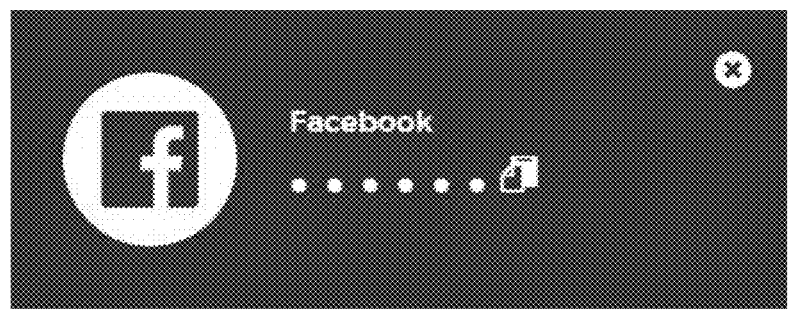
Figure 21:
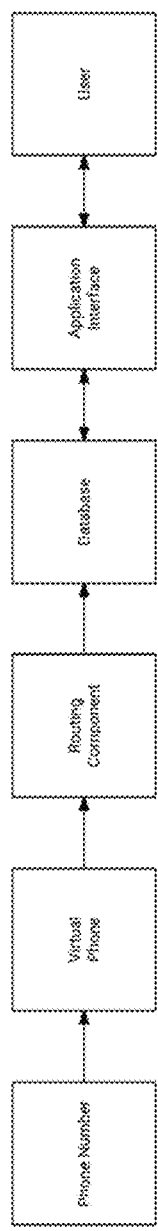
FIGS. 21-45 illustrate a system for receiving multi-factor authentication messages according to embodiments of the present disclosure.
Figure 22:
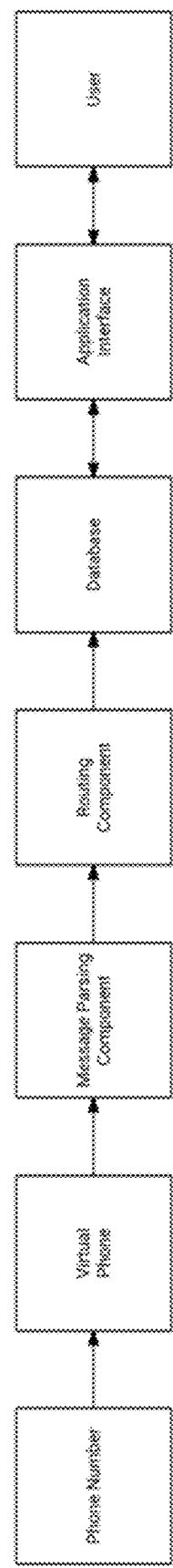
Figure 23:
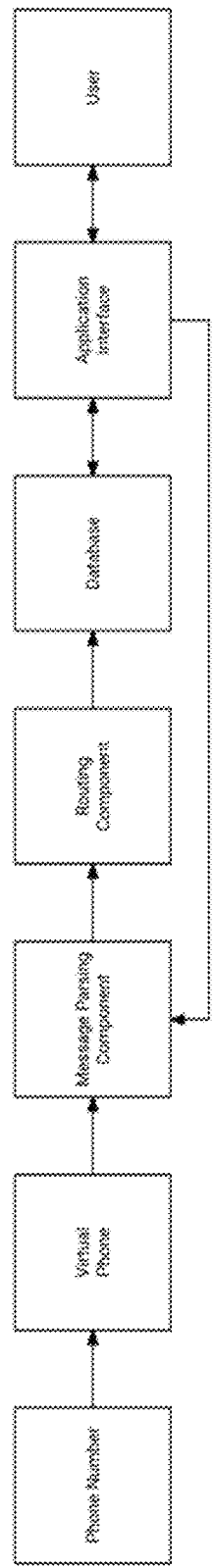
Figure 24:
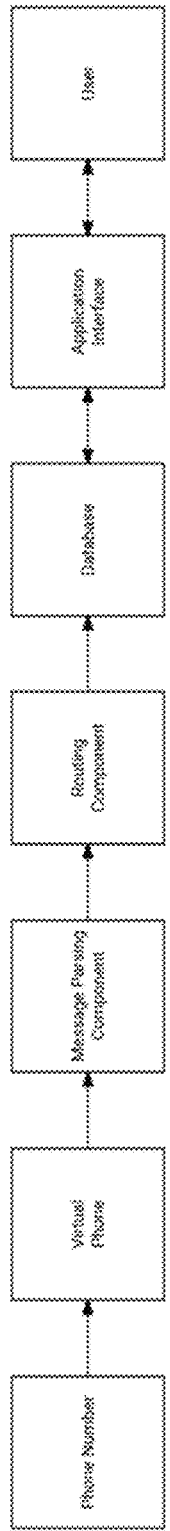
Figure 25:
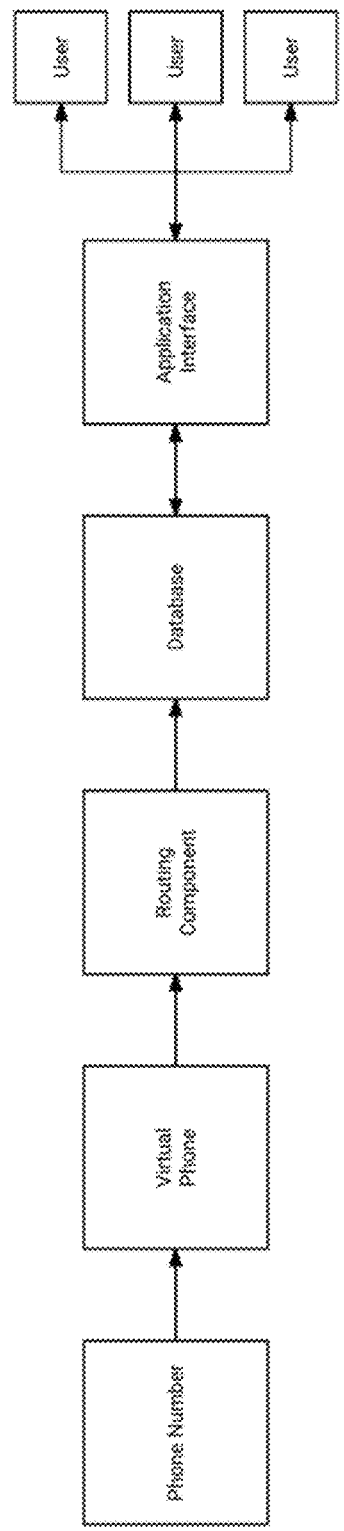
Figure 26:
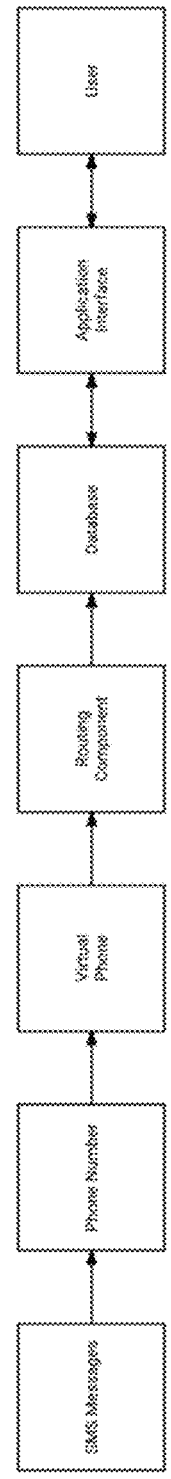
Figure 27:
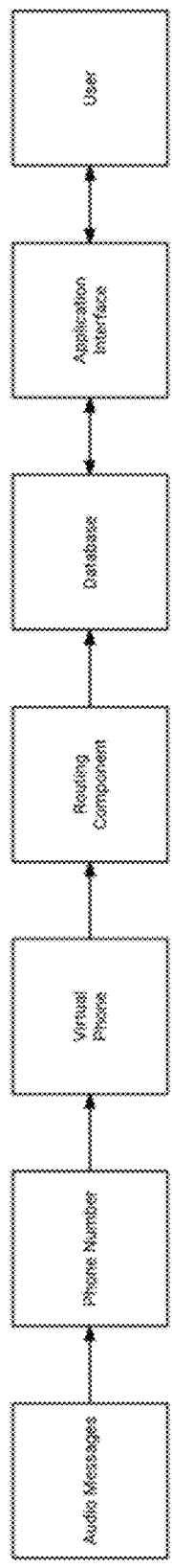
Figure 28:
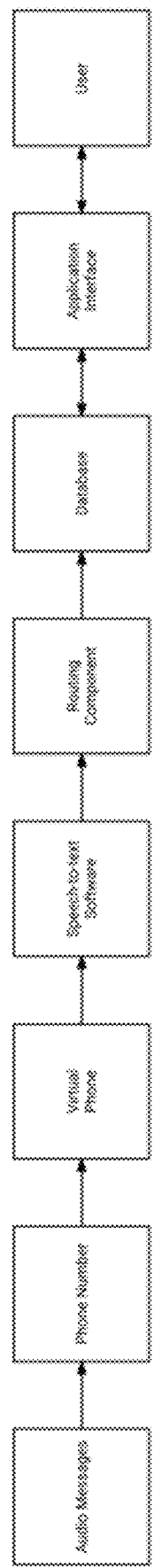
Figure 29:
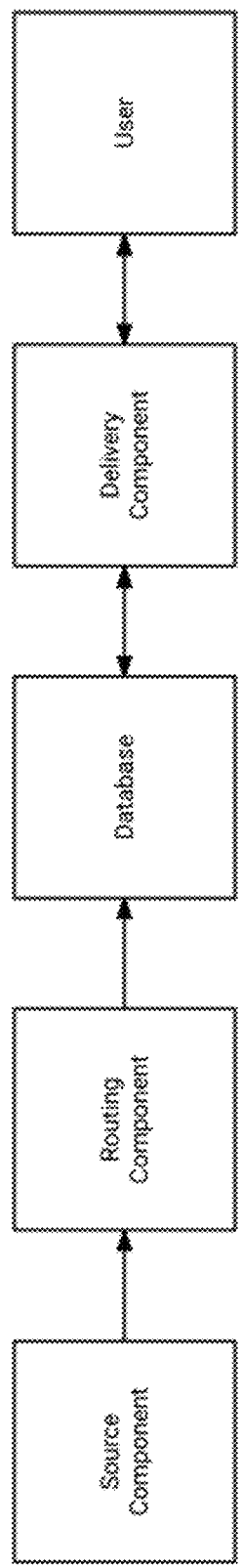
Figure 30:
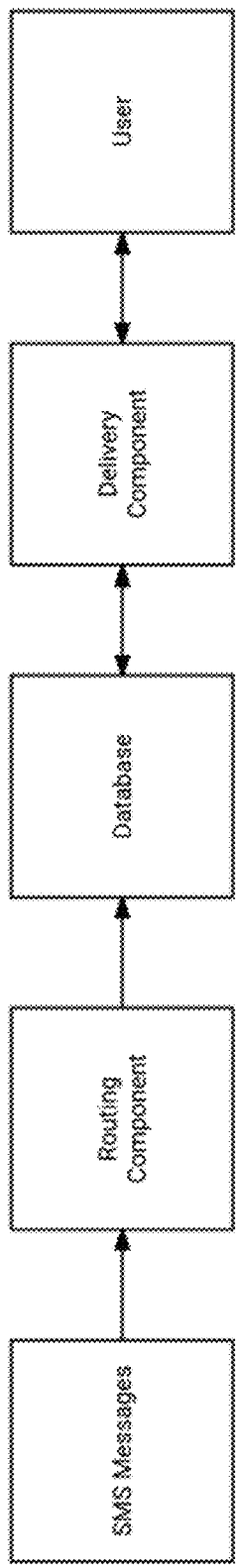
Figure 31:
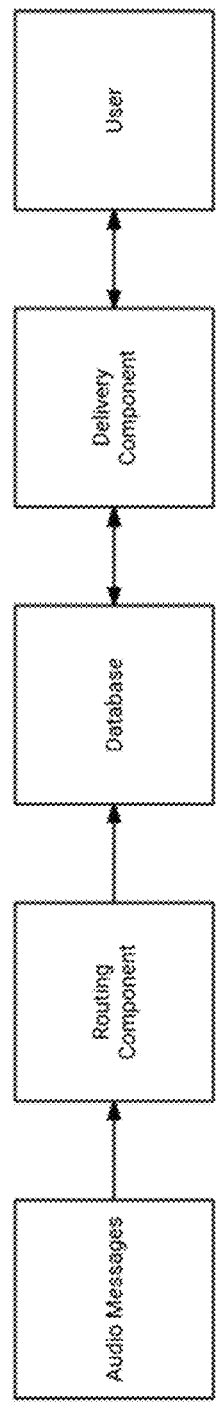
Figure 32:
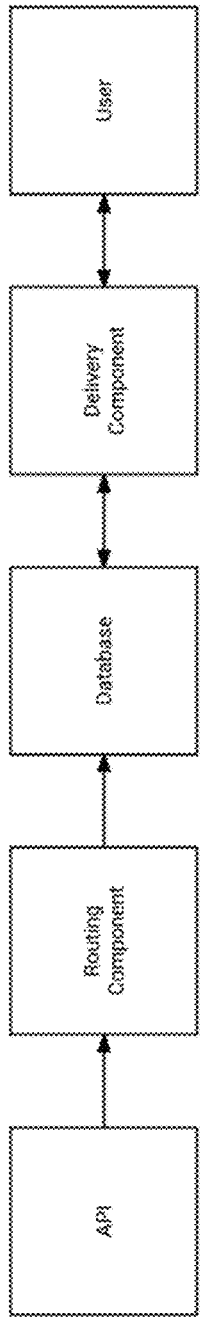
Figure 33:
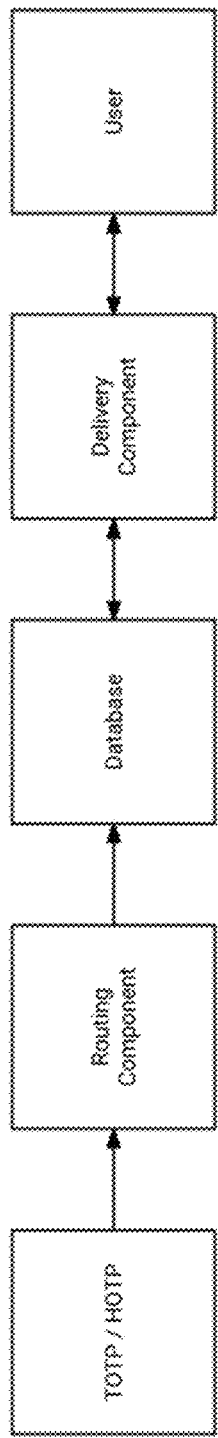
Figure 34:
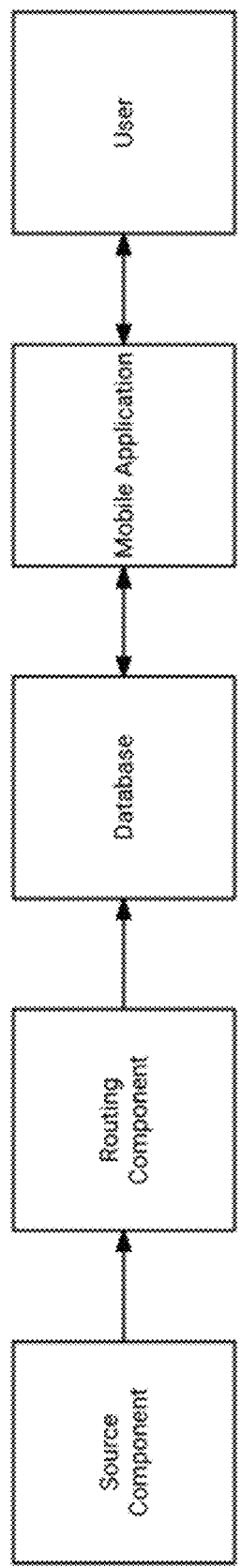
Figure 35:
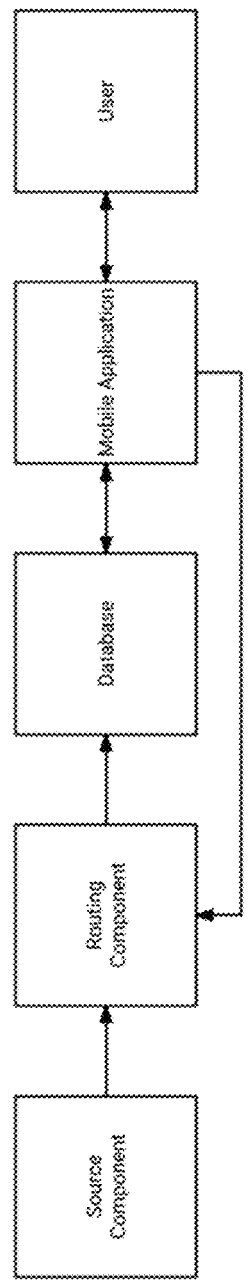
Figure 36:
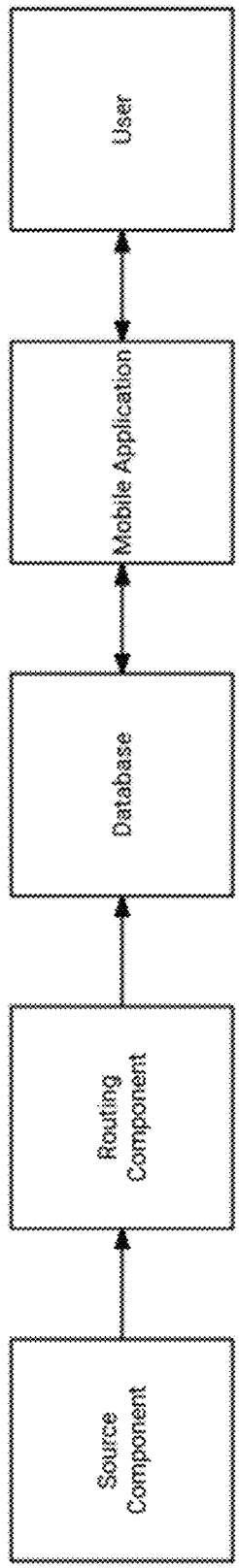
Figure 37:
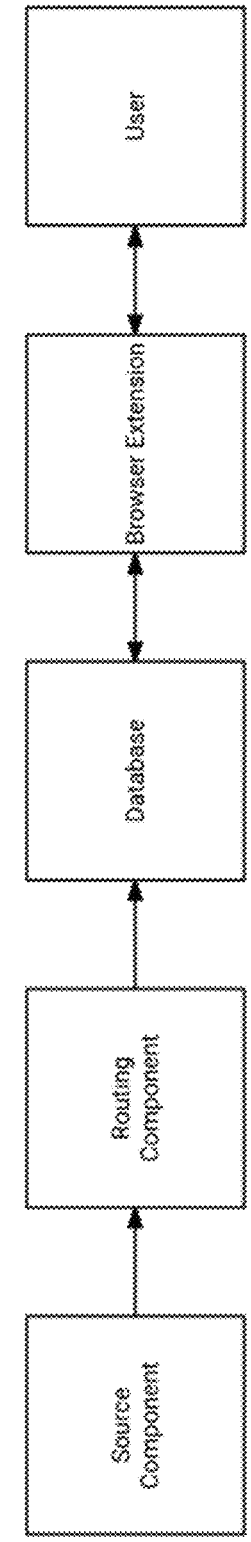
Figure 38:
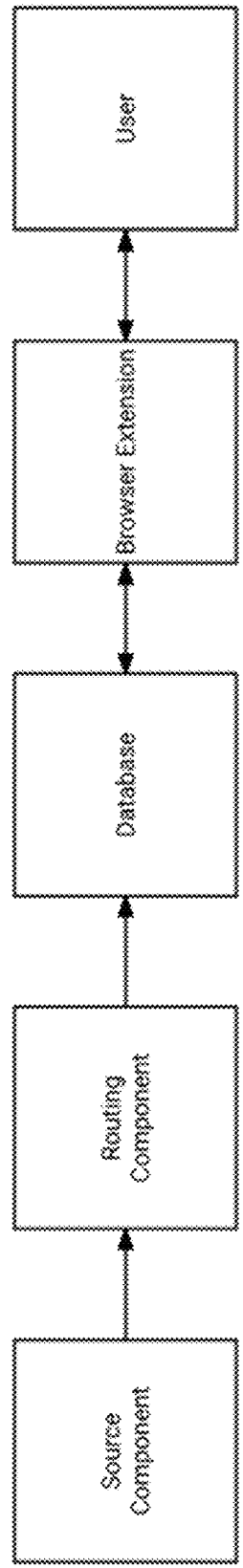
Figure 39:
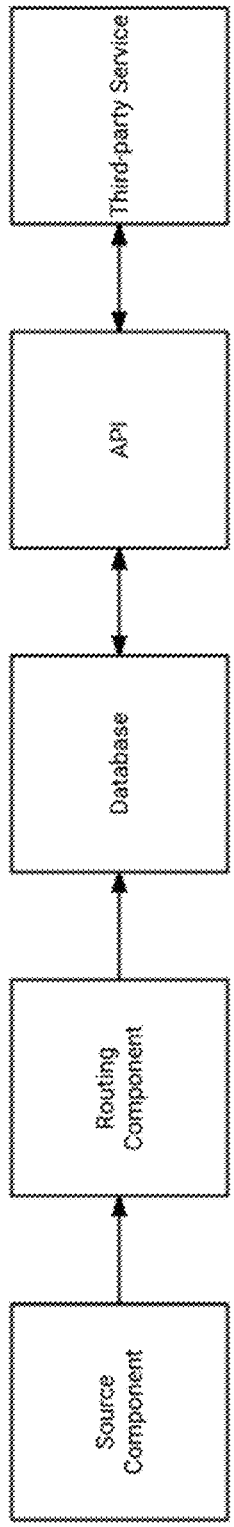
Figure 40:
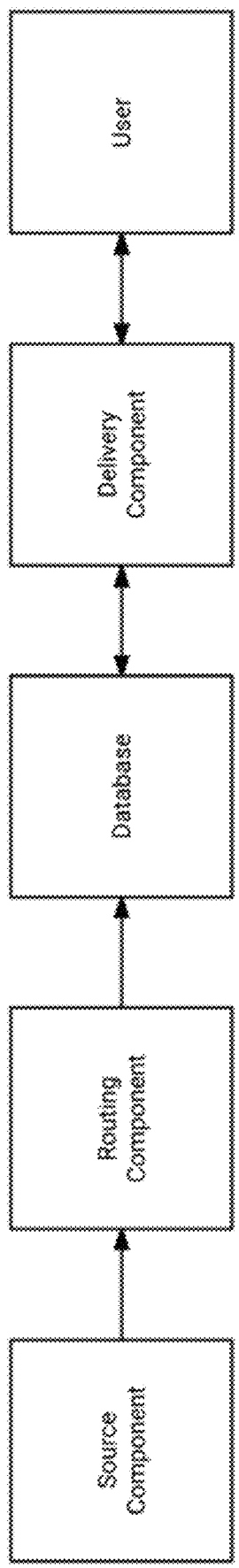
Figure 41:
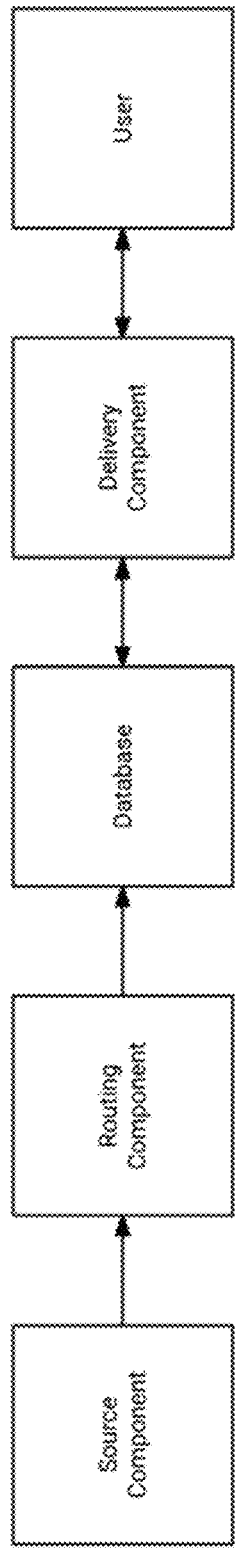
Figure 42:
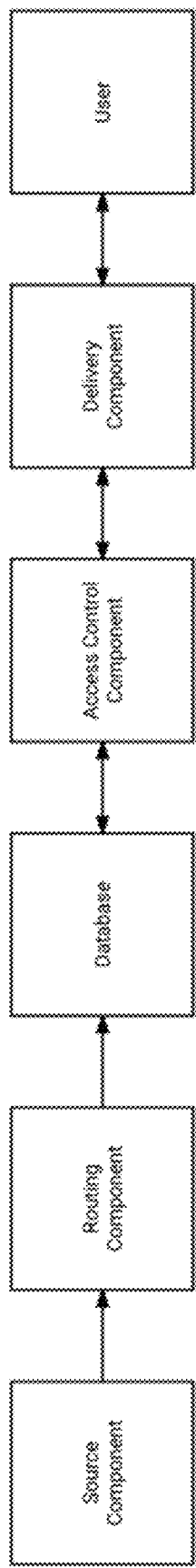
Figure 43:
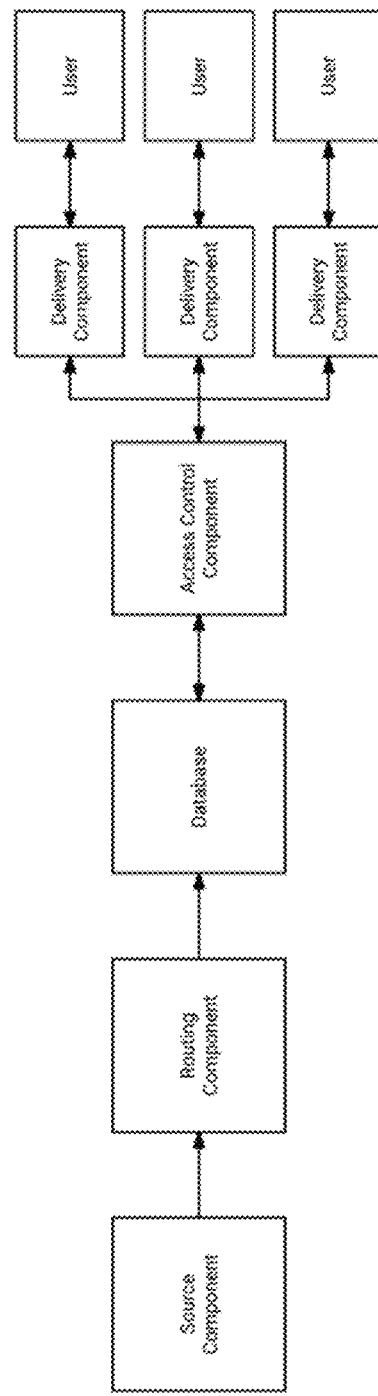
Figure 44:
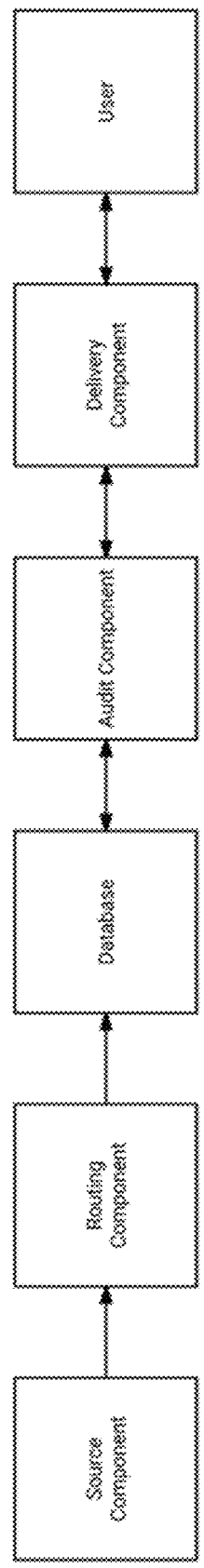
Figure 45:
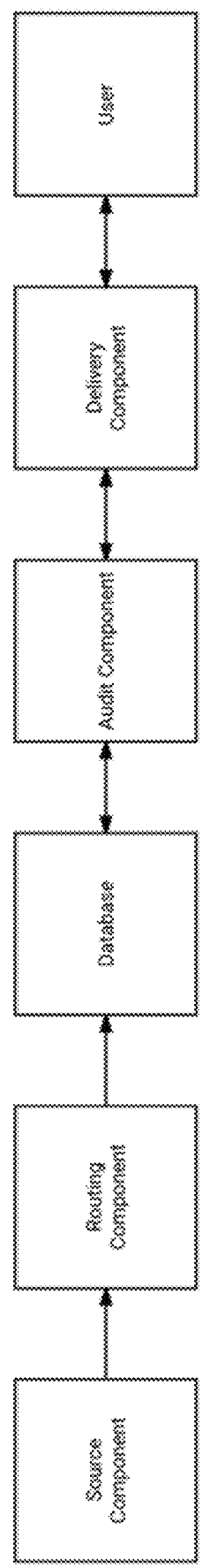

In another embodiment, when a user accesses a two-factor authentication code on the user-facing application 106, accessing of the authentication code may be logged by the two-factor authentication system 100. Referring to FIG. 19, the user-facing application 106 may visually display an authentication code 500 on the user-facing application. By default, the authentication code 500 may be visible to a user accessing the user account on the user-facing application 106. However, in one embodiment (FIG. 20), the authentication code may be concealed from the user on the user-facing application 106. The user may select the concealed authentication code 500 such that the authentication code 500 is then visually revealed to the user on the user-facing application 106. The two-factor authentication system 100 logs any action by a user to reveal the authentication code 500, thereby creating a trail that identifies when users access authentication codes received using the two-factor authentication system 100.

In yet another embodiment, audit trail features of the two-factor authentication system 100 include the logging of recovery codes received using the two-factor authentication system 100 and the logging of any changes to settings of user accounts of the two-factor authentication system 100.

The system and method of virtual two-factor authentication described herein advantageously reduces vulnerabilities associated with traditional SMS two-factor authentication. By eliminating a physical phone device associated with the phone number, a risk of SIM card theft or fraudulent replacement is eliminated. Further, if a user loses a phone or otherwise is unable to access a cellular network, the user is still able to retrieve SMS messages that include a two-factor authentication code. The user is able to access messages received on the virtual phone from any user device with an internet connection to access received messages including an authentication code. Additional advantages include enabling access to a verification code by multiple parties with access to the user account and virtual phone. For example, corporate social media accounts and other similar accounts may require access by multiple users of a corporate entity. Those multiple users may log in to a user account of the system of virtual two-factor authentication and view an authentication code received by the virtual phone, thereby reducing the likelihood of a corporate account being compromised.

The system and method of two-factor authentication described herein allows a user to manage and receive multi-factor authentication or verification codes using a single user interface. Further, systems and methods described herein enable a user to obtain authentication codes from a number of sources in a single location, and further allows those verification codes to be aggregated even if the authentication codes are generated by different methods from one another. The user controls access to accounts of the user with the authentication codes and is able to provide and revoke access to the verification codes for other users.

Additional advantages of embodiments of systems and methods of multi-factor authentication described herein include the ability to share the ability to login to an account between users without requiring changing of a password or other login requirements of the account. Because the multi-factor authentication code is required for login, if a user lacks access to that code then the user is unable to login to the account. Further, the authentication code used in most multi-factor authentication methods changes for each login or after a certain period of time. If a user does not have access to the multi-factor authentication code using systems and methods described herein, the user is unable to login to the account. Thus, when access to the system of multi-factor authentication for a particular user is revoked, that user is unable to login to the accounts. Systems and methods described herein allow for revocation of access to an account to a particular user without changing a password to the accounts. This is particularly beneficial for groups or teams, such as a social media team, because the password is not required to be reset for remaining users on the account.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for a user receiving multi-factor authentication messages comprising:
   providing a virtual phone server including one or more virtual phones hosted thereon, the one or more virtual phones associated with one or more telephone numbers and configured to receive multi-factor authentication messages transmitted to the one or more telephone numbers upon request of the user, at least one of the one or more virtual phones associated with the user;
   routing the multi-factor authentication messages to the at least one of the one or more virtual phones associated with the user and hosted on the virtual phone server based on data derived from the multi-factor authentication messages;
   storing at least a portion of the multi-factor authentication messages in association with the user on a database;
   providing a user-facing interface for providing access to the user of data derived from the received authentication message.

2. The method of claim 1, further comprising parsing the multi-factor authentication messages to determine a source of the multi-factor authentication messages, wherein a source of the multi-factor authentication messages is determined based on one or more of: text within a body of the received multi-factor authentication messages; an origination phone number of the multi-factor authentication messages; a destination phone number of the multi-factor authentication messages; and data derived from a body of the multi-factor authentication messages.

3. The method of claim 2, wherein the multi-factor authentication messages are further parsed such that a source of the multi-factor authentication messages is recognized based on previous actions of the one or more users.

4. The method of claim 1, further comprising identifying a multi-factor authentication code within the multi-factor authentication messages.

5. The method of claim 1, wherein the multi-factor authentication messages comprise SMS messages containing an authentication code.

6. The method of claim 1, wherein the multi-factor authentication messages comprise audio messages containing a multi-factor authentication code.

7. The method of claim 6, wherein audio messages containing the multi-factor authentication code are further analyzed using speech-to-text software prior to data being derived from the received audio messages.

8. A method for managing multi-factor authentication of a plurality of users, the method comprising:
receiving multi-factor authentication data associated with the plurality of users, the multi-factor authentication data generated by one or more of: receiving multi-factor authentication data via a network; generating multi-factor authentication data using an algorithm; and a user manually entering multi-factor authentication data;
associating the received multi-factor authentication data with a user from the plurality of users;
storing the multi-factor authentication data in association with the user from the plurality of users;
displaying the multi-factor authentication data to the user from the plurality of users on a user device.

9. The method of claim 8, wherein the received multi-factor authentication data is from an SMS message.

10. The method of claim 8, wherein the received multi-factor authentication data is an audio message including a spoken authentication code.

11. The method of claim 8, wherein the received multi-factor authentication data is received over a network from an API.

12. The method of claim 8, further comprising providing an application implemented on a user device and wherein the received multi-factor authentication data is from the user device through the application.

13. The method of claim 12, wherein the received multi-factor authentication message is from an authentication message received on the user device.

14. The method of claim 12, wherein the application implemented on the user device verifies an identity of the user through biometric data collected via one or more sensors of the user device.

15. The method of claim 12, wherein the application automatically inputs an authentication code during a login process on the user device.

16. The method of claim 15, wherein the application automatically inputs an authentication code via a browser extension installed on a web browser of the user device.

* * * * *